United States Patent
Nagarajan et al.

(10) Patent No.: US 10,133,670 B2
(45) Date of Patent: Nov. 20, 2018

(54) LOW OVERHEAD HIERARCHICAL CONNECTIVITY OF CACHE COHERENT AGENTS TO A COHERENT FABRIC

(71) Applicant: Intel Corporation, Santa Clara, CA (US)

(72) Inventors: Ramadass Nagarajan, Portland, OR (US); Jose S. Niell, Franklin, MA (US); Michael T. Klinglesmith, Portland, OR (US); Derek T. Bachand, Portland, OR (US); Ganesh Kumar, Fort Collins, CO (US)

(73) Assignee: Intel Corporation, Santa Clara, CA (US)

( * ) Notice: Subject to any disclaimer, the term of this patent is extended or adjusted under 35 U.S.C. 154(b) by 237 days.

(21) Appl. No.: 14/583,611

(22) Filed: Dec. 27, 2014

(65) Prior Publication Data

US 2016/0188469 A1    Jun. 30, 2016

(51) Int. Cl.
*G06F 12/0815* (2016.01)
*G06F 13/28* (2006.01)
*G06F 13/42* (2006.01)

(52) U.S. Cl.
CPC ........ *G06F 12/0815* (2013.01); *G06F 13/287* (2013.01); *G06F 13/4282* (2013.01); *G06F 2212/621* (2013.01)

(58) Field of Classification Search
CPC .......... G06F 12/08; G06F 13/42; G06F 13/28; G06F 13/4282; G06F 13/287; G06F 2212/621
See application file for complete search history.

(56) References Cited

U.S. PATENT DOCUMENTS

| | | | | |
|---|---|---|---|---|
| 6,237,064 B1 * | 5/2001 | Kumar | ........ | G06F 12/0884 711/122 |
| 6,266,751 B1 * | 7/2001 | Niescier | ........ | G06F 12/0284 711/147 |

(Continued)

FOREIGN PATENT DOCUMENTS

| WO | 2016105864 A1 | 6/2016 |
|---|---|---|
| WO | 2016105952 | 6/2016 |

OTHER PUBLICATIONS

International Search Report and Written Opinion in International Application No. PCT/US2015/064856 dated Mar. 28, 2016; 12 pages.

(Continued)

*Primary Examiner* — Henry Tsai
*Assistant Examiner* — Christopher A Daley
(74) *Attorney, Agent, or Firm* — Alliance IP, LLC

(57) ABSTRACT

In an example, a system-on-a-chip comprises a plurality of multi-core processors, such as four dual-core processors for eight total cores. Each of the processors connects to shared resources such as memory and peripherals via a shared uncore fabric. Because each input bus for each core can include hundreds of data lines, the number of lines into the shared uncore fabric can become prohibitive. Thus, inputs from each core are multiplexed, such as in a two-to-one configuration. The multiplexing may be a non-blocking, queued (such as FIFO) multiplexing to ensure that all packets from all cores are delivered to the uncore fabric. In certain embodiment, some smaller input lines may be provided to the uncore fabric non-multiplexed, and returns (outputs) from the uncore fabric to the cores may also be non-multiplexed.

14 Claims, 14 Drawing Sheets

(56) References Cited

U.S. PATENT DOCUMENTS

| | | | | |
|---|---|---|---|---|
| 6,628,662 | B1* | 9/2003 | Blackmon | H04L 49/254<br>370/447 |
| 7,982,497 | B1* | 7/2011 | Trimberger | H03K 19/177<br>326/101 |
| 8,131,944 | B2* | 3/2012 | Fang | G06F 12/0822<br>711/141 |
| 8,856,456 | B2* | 10/2014 | Hendry | G06F 12/0831<br>711/146 |
| 8,886,899 | B1* | 11/2014 | Bao | G06F 12/10<br>710/316 |
| 9,448,741 | B2* | 9/2016 | Deshpande | G06F 3/0653 |
| 9,448,937 | B1* | 9/2016 | Ahmad | G06F 12/0815 |
| 9,575,895 | B2* | 2/2017 | Liu | G06F 12/0831 |
| 2003/0152114 | A1* | 8/2003 | Sandstrom | H04J 3/047<br>370/537 |
| 2005/0228952 | A1* | 10/2005 | Mayhew | G06F 12/0817<br>711/133 |
| 2008/0162661 | A1* | 7/2008 | Mannava | G06F 12/0831<br>709/213 |
| 2008/0320236 | A1* | 12/2008 | Ueda | G06F 12/0831<br>711/146 |
| 2010/0274975 | A1* | 10/2010 | Sistla | G06F 12/0817<br>711/146 |
| 2011/0191542 | A1* | 8/2011 | Vash | G06F 12/08<br>711/130 |
| 2013/0185545 | A1* | 7/2013 | Lin | G06F 9/30043<br>712/225 |
| 2014/0040528 | A1* | 2/2014 | Chang | G06F 13/36<br>710/317 |
| 2014/0075082 | A1* | 3/2014 | Coleman | G06F 13/4022<br>710/316 |
| 2014/0108744 | A1* | 4/2014 | Moll | G06F 12/0831<br>711/146 |
| 2014/0189411 | A1* | 7/2014 | Kanchana | G06F 1/3225<br>713/324 |
| 2014/0258620 | A1* | 9/2014 | Nagarajan | G06F 12/0815<br>711/120 |
| 2014/0289435 | A1* | 9/2014 | Lakshmanamurthy | G06F 15/7864<br>710/112 |

OTHER PUBLICATIONS

International Preliminary Report on Patentability issued in International Application No. PCT/US2015/064856 dated Jun. 27, 2017; 11 pages.

Barroso L.A., et al., "Piranha: A Scalable Architecture Based on Single-Chip Multiprocessing", ACM SIGARCH Computer Architecture News, vol. 28, No. 2, May 2000, pp. 282-293.

Dupont de Dinechin, B., et al., "Guaranteed Services of the NoC of a Manycore Processor", NoCArc 2014, Dec. 13, 2014, Cambridge, UK, pp. 11-16.

Extended European Search Report for EP Application No. 15874110.8 dated Jul. 9, 2018, 13 pages.

Jafari, F., et al., "Max-Min-Fair Best Effort Flow Control in Network-on-Chip Architectures", In: Bubak M., et al. (eds), Computational Science—ICCS 2008. Lecture Notes in Computer Science, vol. 5101, pp. 436-445.

Marculescu, R., et al., "Outstanding Research Problems in NoC Design: System, Microarchitecture, and Circuit Perspectives", IEEE Transactions on Computer-Aided Design of Integrated Circuits and Systems, vol. 28, No. 1, Jan. 2009, pp. 3-21.

* cited by examiner

LOW OVERHEAD HIERARCHICAL CONNECTIVITY OF CACHE COHERENT AGENTS TO A COHERENT FABRIC

FIELD

This disclosure pertains to computing system, and in particular (but not exclusively) to a shared uncore fabric.

BACKGROUND

In many computer systems with multiple devices, an arbitration is performed to provide access to a shared resource such as a shared memory. Different types of arbitration mechanisms are provided to enable arbitration between the different agents or requestors. Some systems use a fixed priority arbitration system in which different agents are allocated a particular priority. However, this can lead to unfairness in usage and starvation of one or more agent's ability to obtain access to the shared resource. Other arbitration systems provide for a round robin-based approach to allocating access to the shared resource, In certain embodiments, the arbitration does not account for shared resource factors such as power state. Thus, in one example, a request is granted access to the shared resource and causes the resource to exit a low power state, although the device does not require immediate access to the shared resource.

DETAILED DESCRIPTION

Figure 1:
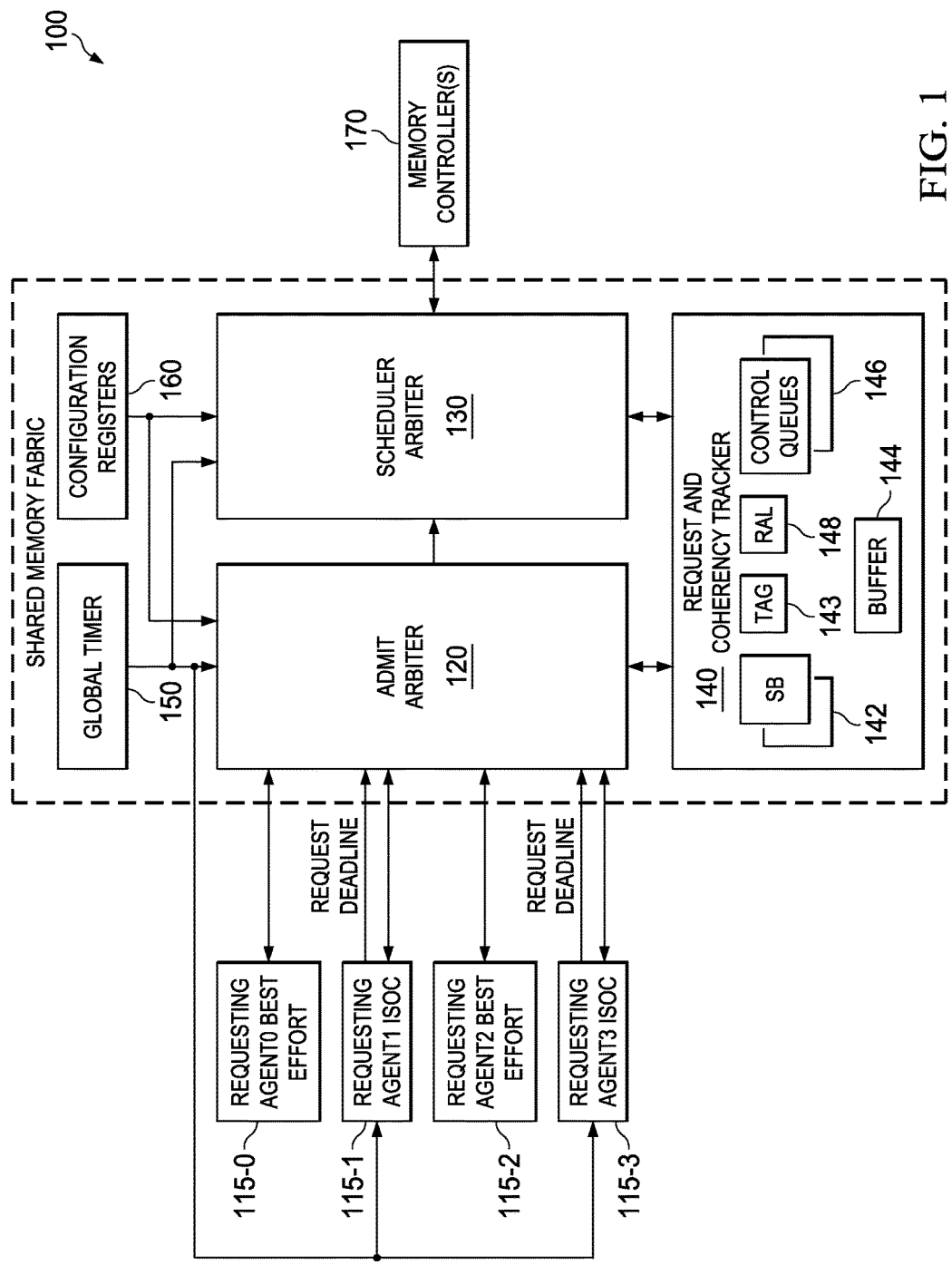
FIG. 1 is a block diagram of a portion of a shared memory fabric according to one or more examples of the present Specification.

In the following description, numerous specific details are set forth, such as examples of specific types of processors and system configurations, specific hardware structures, specific architectural and micro architectural details, specific register configurations, specific instruction types, specific system components, specific measurements/heights, specific processor pipeline stages and operation etc. in order to provide a thorough understanding of the present invention. It will be apparent, however, to one skilled in the art that these specific details need not be employed to practice the present invention. In other instances, well known components or methods, such as specific and alternative processor architectures, specific logic circuits/code for described algorithms, specific firmware code, specific interconnect operation, specific logic configurations, specific manufacturing techniques and materials, specific compiler implementations, specific expression of algorithms in code, specific power down and gating techniques/logic and other specific operational details of computer system haven't been described in detail in order to avoid unnecessarily obscuring the present invention.

In an example, a control system may include a system-on-a-chip (SoC), including one processor for real-time operation to manage devices in the control system, and another processor configured to execute auxiliary functions such as a user interface for the control system. The first core and second core may share memory such as dynamic random access memory (DRAM), and may also share an uncore fabric configured to communicatively couple the processors to one or more peripheral devices. The first core may require a guaranteed quality of service (QoS) to memory and/or peripherals. The uncore fabric may be divided into a first "real-time" virtual channel designated for traffic from the first processor, and a second "auxiliary" virtual channel designated for traffic from the second processor. The uncore fabric may apply a suitable selection or weighting algorithm to the virtual channels to guarantee the QoS.

In various embodiments, a shared fabric couples multiple independent devices, also referred to herein as "agents," to a shared memory and to input/output (I/O) devices. In one embodiments, the shared fabric comprises an interconnect structure of a single die semiconductor device that includes intellectual property (IP) logic blocks of different types. At a high level, the shared fabric may include a shared memory fabric for accessing system memory, shared I/O interconnect fabric, and a system agent that provides intelligence to the overall shared fabric. The shared fabric may be configured to enable compliance with quality of service (QoS) requirements for time-critical isochronous devices while also providing memory bandwidth proportioning for non-isochronous devices, also referred to herein as "best effort" devices.

This fabric may be referred to as "uncore," indicating that the interconnects, registers, and other resources provided in the fabric are not part of the processing cores that comprise the "agents." The uncore fabric may include the memory fabric described above, portions that connect "agents" to memory, and also portions that connect agents to each other and in particular, processor cores to other "agents."

Reliable and predictable allocation and scheduling of memory bandwidth occurs to support multiple devices and device types connected to the shared memory fabric. By including QoS functionality in a common shared memory fabric (rather than a memory controller or other non-fabric circuitry), the design may be more easily reused across multiple semiconductor devices such as systems-on-a-chip (SOCs) since the design is independent of memory technology.

Embodiments thus perform resource allocation, bandwidth apportioning and time-aware QoS properties in a shared memory fabric to provide predictable and reliable memory bandwidth and latencies to meet the requirements of devices connected to the fabric.

A class of service category is assigned to each device coupled to the shared memory fabric. In an embodiment, this assignment can be identified using configuration registers of the fabric. Multiple classes of service may be supported by the fabric. In one non-limiting example, devices of two classes of service categories may be present, including an isochronous class of service category used for latency sensitive devices and a best effort class of service category used for devices that can tolerate longer latencies to service their requests to memory. In some embodiments, latency sensitive devices include content rendering devices such as, by way of non-limiting example, audio or video players, camera devices, and so forth, while lower priority devices include processor cores, graphics processing units, and so forth.

Time, in the form of a request deadline, is communicated from the isochronous devices to the fabric to indicate to the fabric the required latency to complete a request to memory. To enable synchronization, the fabric broadcasts a global timer to all isochronous requesting agents. This global timer is continuously driven on outputs from the fabric so it is available for sampling by the isochronous devices. Responsive to this time value, the agents determine a latency requirement for completion of a request and add this latency value to the global timer value to form a deadline for the request. As an example, the latency for a read can be determined by the amount of data in the agent's data buffer and the drain rate of the buffer by the agent. If the agent consumes 1 cache line of data every 250 nanoseconds (ns) and has 8 cache lines of data in the buffer, the required deadline for a new request would 8×250 ns or 2 microseconds (μs) before the buffer is empty. Based on this communicated latency or deadline value, the fabric may make better scheduling decisions based on knowledge of the current power state of the memories and the required latencies for other unscheduled memory requests pending in the fabric. This deadline communication may improve memory bandwidth and also save system power.

The use of request deadlines provides the fabric with latency information for each request from an isochronous device. Configuration registers programmed within the fabric provide the fabric with information about the memory configuration such as the latency required for the memories to exit a low power, e.g., self-refresh and state. The fabric also controls when the memory controller causes the attached memory to enter and exit the self-refresh state by sending an indication to the memory controller, e.g., in the form of a status channel. The fabric determines when the memories should enter and exit self-refresh by evaluating the latency requirements for all pending memory requests. Because the fabric has knowledge of the required latency for all pending memory requests and required latency to exit self-refresh, greater management of power state transitions of the memories may results in additional power savings.

Embodiments may also provide for efficiency in memory bandwidth by allowing memory requests to be scheduled out of order; however this may result in long scheduling latencies for some requests. To resolve such concern, the fabric assigns a priority level to each isochronous memory request, e.g., a high or low priority. When scheduling high priority isochronous requests, the amount of out-of-order scheduling allowed is less than what is acceptable when scheduling best effort or low priority isochronous requests. Limiting the amount of out-of-order scheduling for high priority requests ensures that the request latency requirement is met. Because request priority is determined from the deadline of the request, the fabric can determine immediately after a request is scheduled what the priority levels of other pending requests are for an isochronous device. Using the deadline method the priority level of all pending requests change only when the global timer increments.

Embodiments may also improve portability and reuse of the sophisticated QoS memory scheduling algorithms across multiple SoC implementations, in that intelligent memory scheduling logic is incorporated in the fabric, while technology specific memory controller logic may be implemented within the memory controller.

Embodiments may also incorporate anti-starvation algorithms into multiple arbitration points of the fabric. In one embodiment, these anti-starvation algorithms include a weighted age-based arbitration method used by an admit arbiter and an oldest of available scheduling queues used in a memory scheduler and request tracker. In addition, request weights may be used to switch between different priority levels at the arbitration points in the fabric and for switching from scheduling read requests to write requests, in contrast to fixed-priority arbitration in which requests from high priority isochronous devices always win.

In an embodiment, the shared memory fabric includes two arbitration points that are used for scheduling requests being sent to the memory controller. The first arbitration point is used to admit requests from the devices into the shared memory fabric and is referred to as an "admit arbiter." The second arbitration point is used to schedule the requests sent to the memory controller from the shared memory fabric and is referred to as a "scheduler arbiter."

Each device connected to the shared memory fabric has a request interface that is connected between the device and fabric. The request interface supplies information about the request that can be used for QoS memory scheduling. In an embodiment, this information includes a memory address, order ID field and an opcode field. For isochronous devices an additional field called a request deadline field is provided to indicate the required latency needed to complete the request. Note that in some implementations of SoCs the memory fabric interface may be connected to other fabrics or switches which allows multiple devices to share a common request interface.

In one embodiment of an SoC, one or more requesting agents are designated as "real-time" cores, while one or more requesting agents are designated as "auxiliary" cores, which are provided on a best-effort basis. As an example, an SoC may be provided to control industrial machinery, provide life support functions, control an autonomous or semi-autonomous vehicle (such as a crash-avoidance system), or otherwise perform mission-critical or safety-critical functionality. In this example, the SoC includes a dual-core processor, with a first core acting as the real-time agent, and the second core acting as the auxiliary (best-effort) agent.

Design considerations may drive a requirement that the real-time agent perform with a guaranteed QoS so that it does not fail in its control function. The auxiliary agent may perform other tasks that do not require a guaranteed QoS, such as providing a user interface, reporting function, or other support function that does not have critical timing.

In certain applications, the auxiliary agent may provide excess traffic that temporarily "floods" or otherwise overwhelms the uncore fabric so that the real-time agent is temporarily unable to operate on its required guaranteed QoS. For example, if the auxiliary agent provides a user interface, a user's interaction with the interface may provide a stream of data that overwhelms the uncore fabric so that real-time traffic is temporarily bottle necked. This may result in a situation where the real-time agent encounters a failure condition.

To avoid such bottle necks, the uncore fabric may be divided into two or more separate virtual channels. Separation into virtual channels may be accomplished by appending to each data packet flowing through the uncore fabric header information, including the agent that either originated or is to receive the data, and in some cases the device or peripheral that either originated or is to receive the data. For example, header information may designate a particular packet as originating from "core 0" (in this example, the real-time agent) and routed to DRAM. Another packet may be designated as originating from "core 1" (in this example, the auxiliary agent) and routed to a user display. In this case, the arbiters described herein may provide preemptive priority to the first packet over the second packet. In another example, traffic from core 0 to a certain peripheral may be given increased priority, but may not be so critical as to warrant preemptive scheduling. Advantageously, dividing traffic into multiple virtual channels enables of any suitable priority scheme according to the requirements and design parameters of a particular application.

Figure 10:
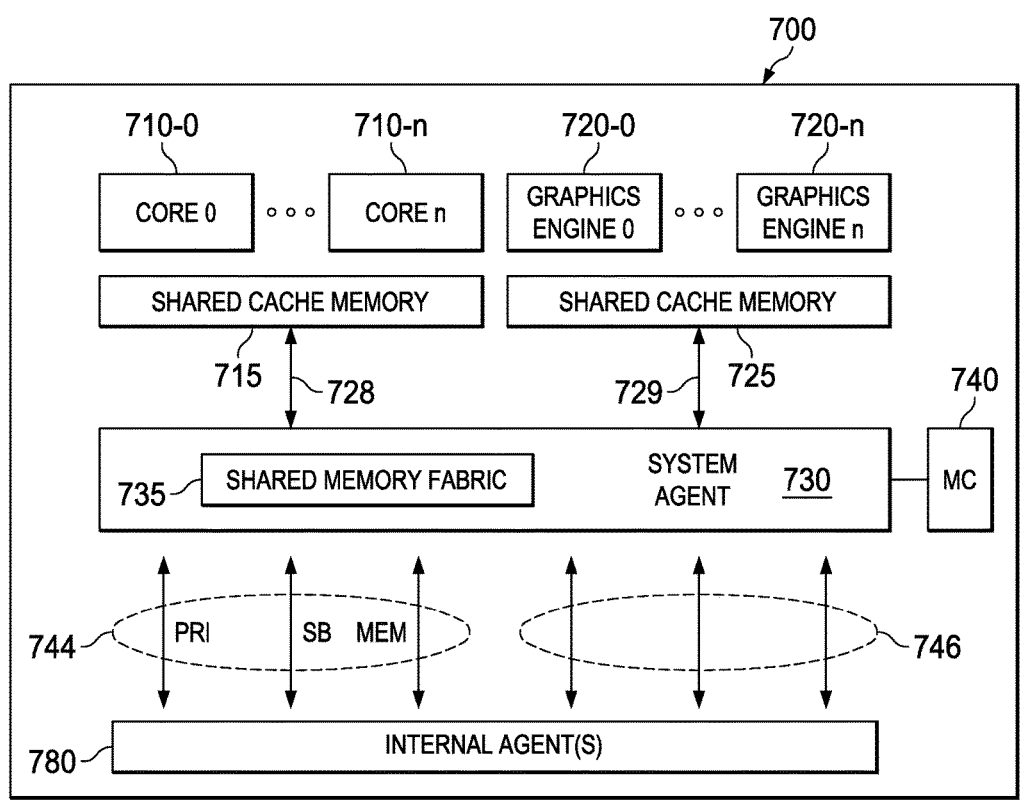
FIG. 10 is a block diagram of an SoC according to one or more examples of the present Specification.
Figure 11:
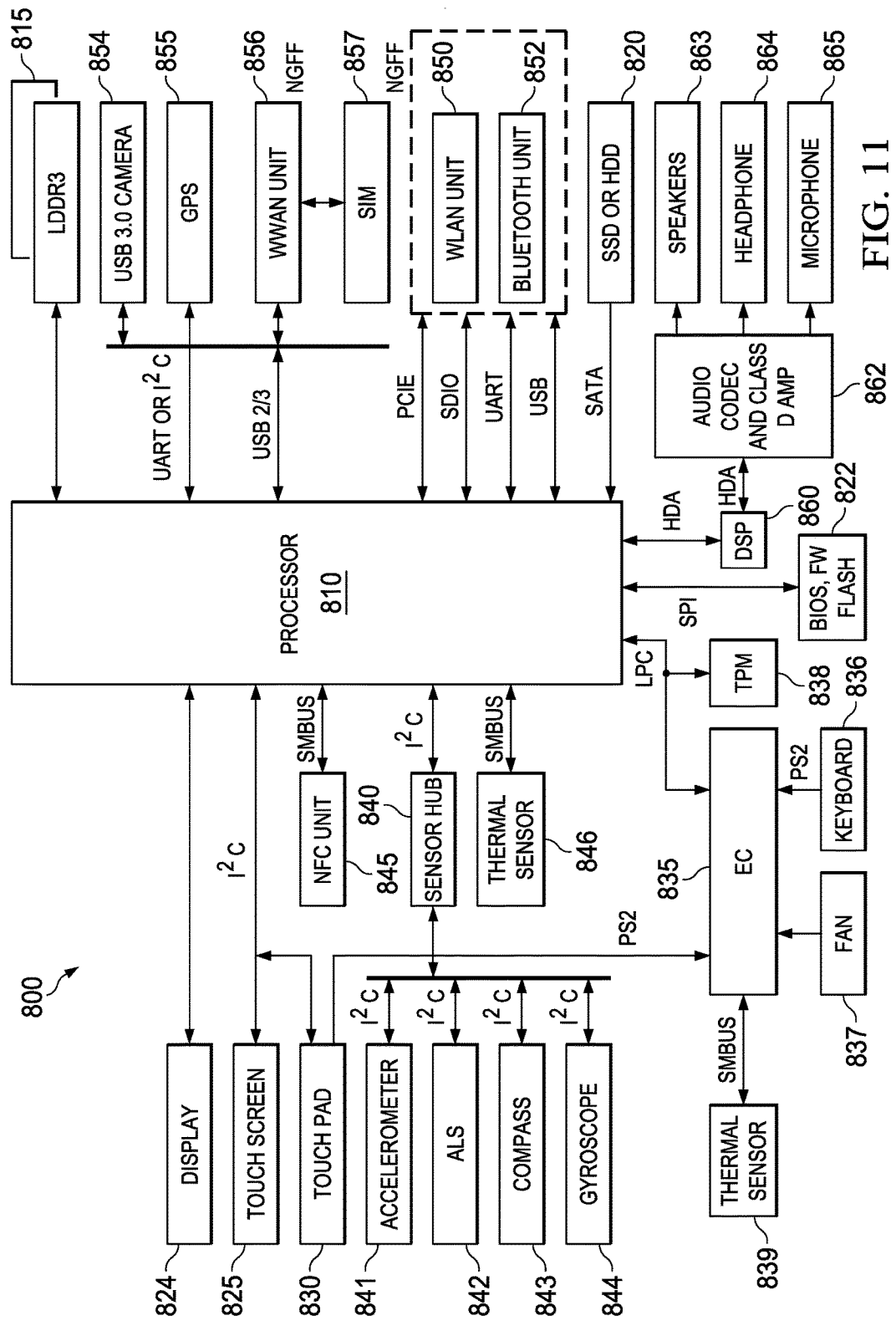
FIG. 11 is a block diagram of components present in a computer system according to one or more examples of the present Specification.
Figure 12:
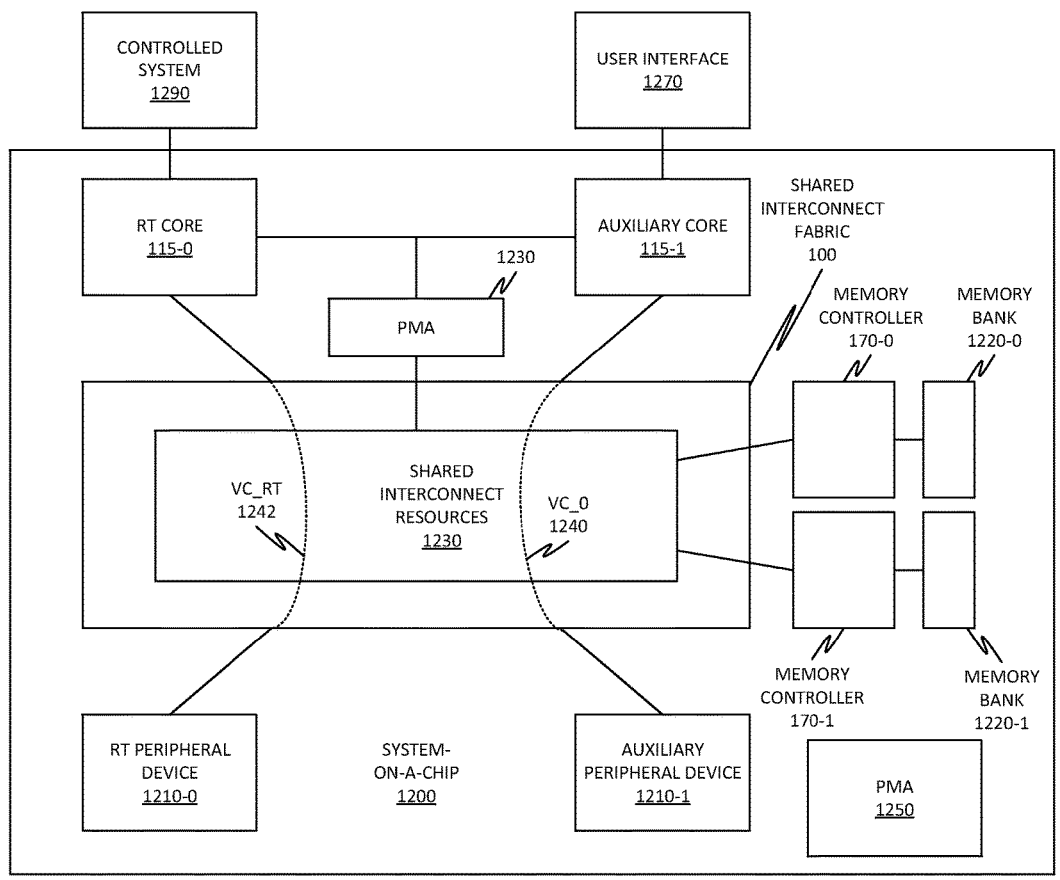
FIG. 12 is a block diagram of an SoC in situ for use in a control system according to one or more examples of the present Specification.
Figure 13:
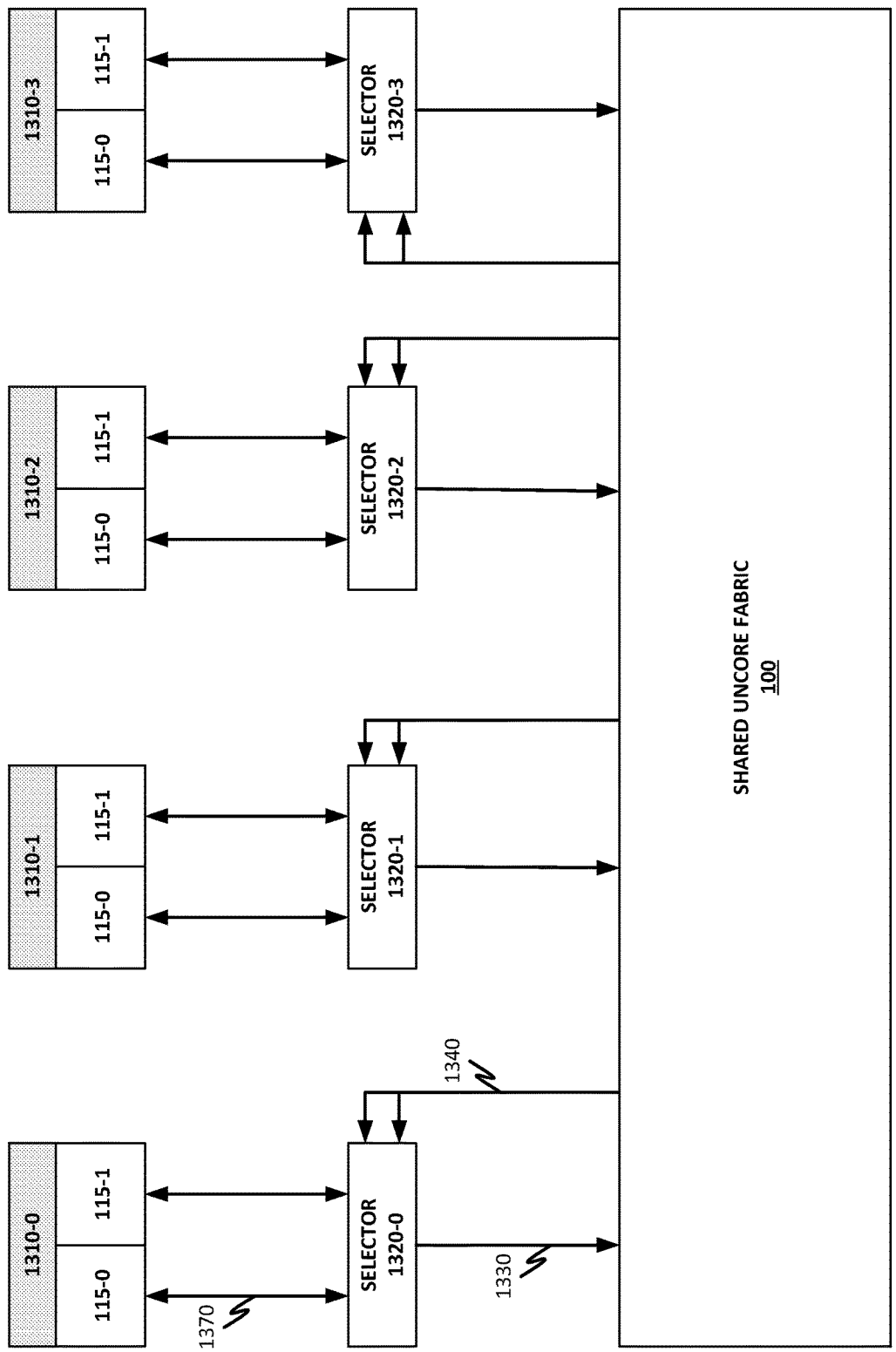
FIG. 13 is a block diagram of selected elements of an SoC according to one or more examples of the present Specification.
Figure 14:
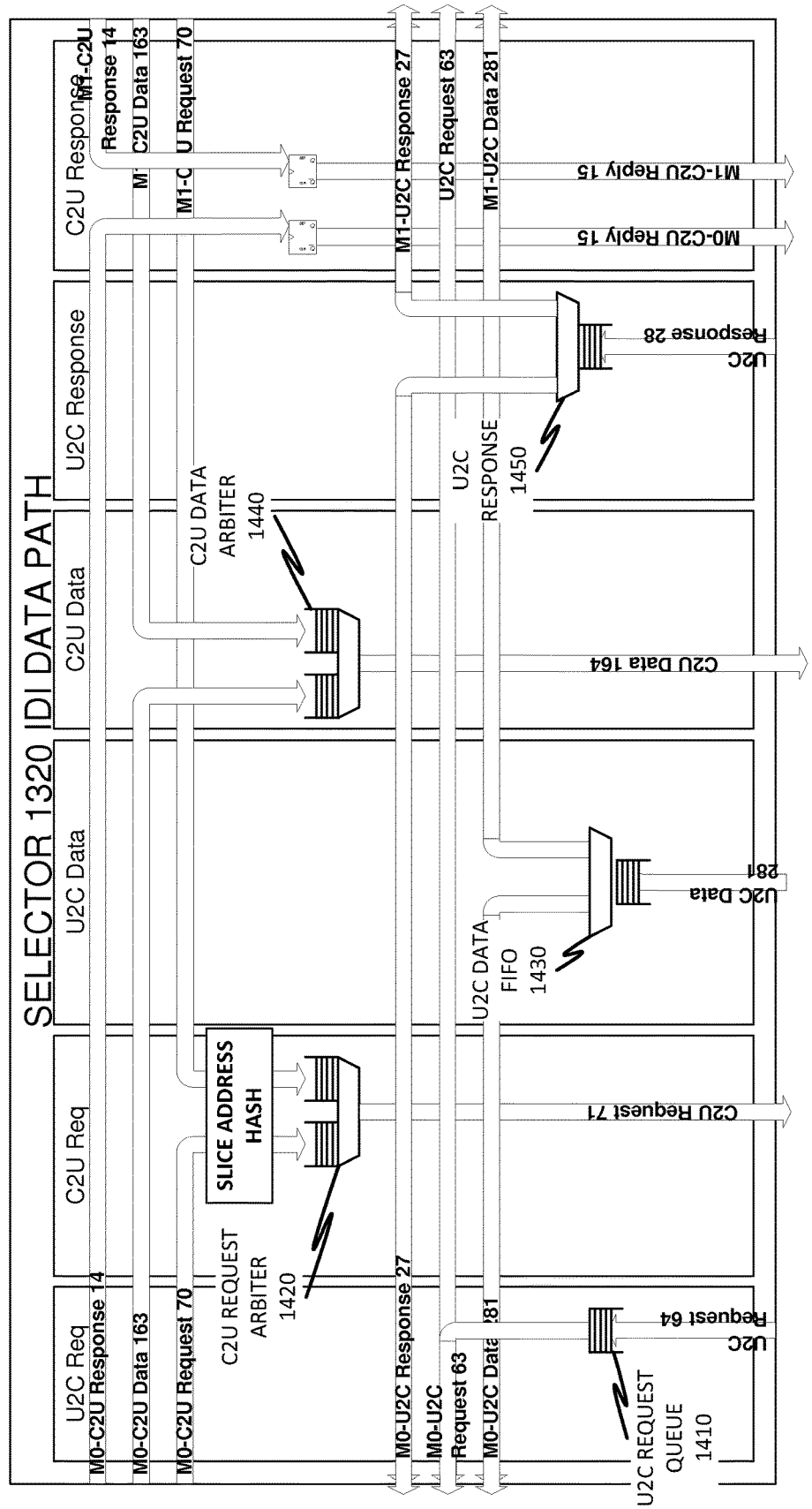
FIGS. 14 and 14A are a block diagram of a selector according to one or more examples of the present Specification.
Figure 14A:
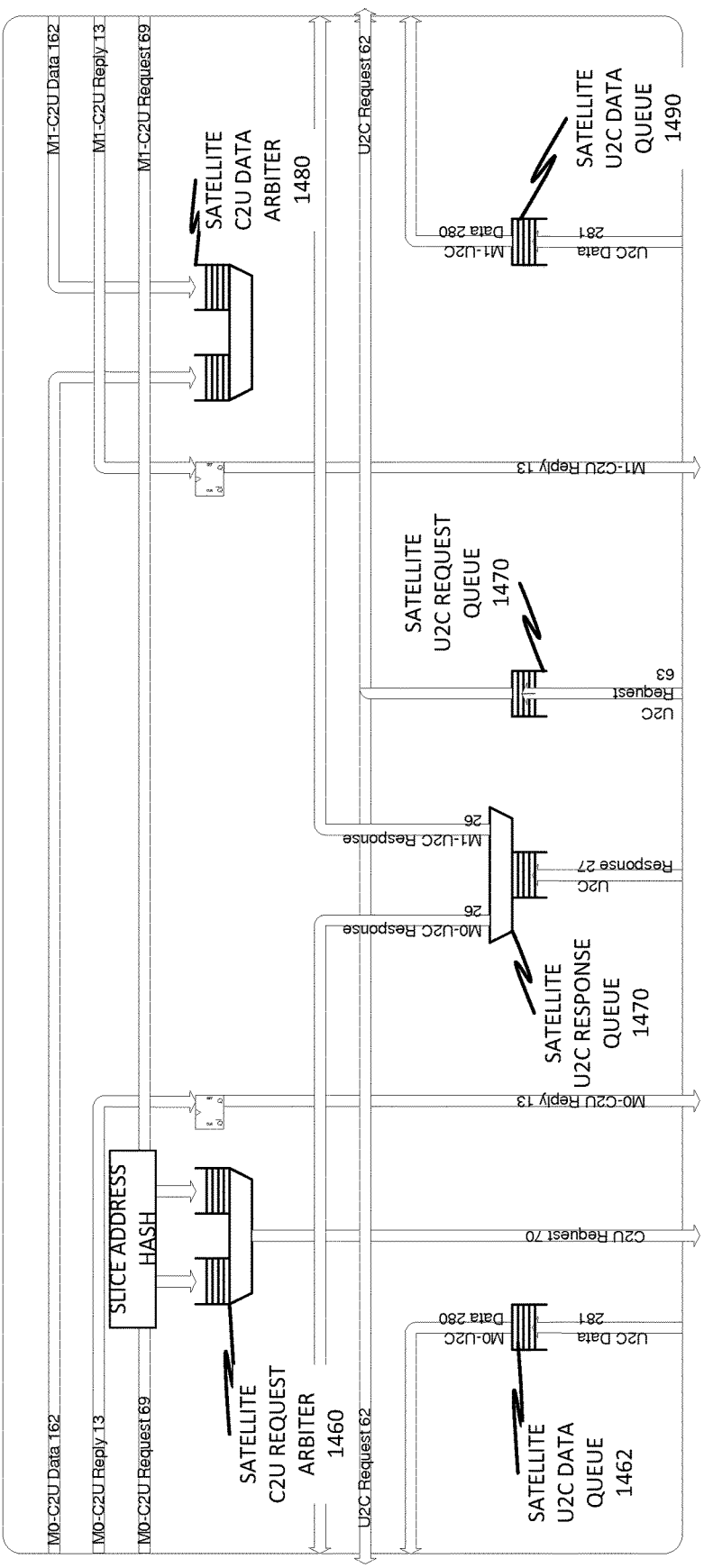

In the FIGURES below, FIGS. 1-9 describe selected portions of the operation of a memory fabric, including a priority and QoS scheme. FIGS. 10 and 11 provide example block diagrams of an SoC and application thereof. FIG. 12 provides an example block diagram of an SoC in situ, including a shared uncore fabric, a real-time agent, and a best-effort agent. FIGS. 13, 14, and 14A provide block diagram of multiplexing.

FIG. 1 is a block diagram of a portion of a shared memory fabric according to one or more examples of the present Specification. As shown in FIG. 1, a shared memory fabric 100 is coupled between a plurality of agents 115-0-115-3 (generically agent 115) and a memory controller 170. Note that in some embodiments more than one memory controller is present. While not shown for ease of illustration, the memory controller may be coupled to a system memory such as a dynamic random access memory (DRAM) or other system memory.

In the embodiment shown in FIG. 1, different types of agents are coupled to shared memory fabric 100. Specifically, the different agents include a first class of service (COS) agent type, namely so-called isochronous agents and a second class of service agent type, namely so-called best effort COS agents. As seen, each of the agents 115 may communicate request information to an admit arbiter 120. In turn, admit arbiter 120 may communicate corresponding control type information back to the agents. In addition, the isochronous agents (namely agents 115-1 and 115-3 in the embodiment of FIG. 1) further include an additional link to communicate request deadline information to admit arbiter 120. To this end, these agents may be further configured to receive global timing information from a global timer 150, also coupled to both admit arbiter 120 and a scheduler arbiter 130.

In the embodiment of FIG. 1, admit arbiter 120 may be configured to receive incoming requests from agents 115 (and request deadline information from isochronous agents) and to select appropriate requests to admit to scheduler arbiter 130. To aid in its arbitration process, admit arbiter 120 receives configuration information from a set of configuration registers 160, further coupled to scheduler arbiter 130. In addition, a request and coherency tracker 140 may be coupled to arbiters 120 and 130. In general, tracker 140 may include multiple scoreboards 142, a data buffer 144, and corresponding address tag storage 145, control queues 146 and other resources such as various buffers, logic such as resource allocation logic 148, and so forth. In some implementations, the tag array and data buffer may be located elsewhere than the tracker. It should be noted that the block diagram of FIG. 1 is intended to be non-limiting, and that other elements may be present in various embodiments.

The shared memory fabric may include certain finite resources that are first allocated before a request from a requesting agent can be granted by the admit arbiter. These resources include available entries in the internal data buffer and address tag storage. Other finite resources include available entries in the memory scheduler and request tracker scoreboards. There is a one-to-one correspondence in resources for the fabric's internal data buffer, tag array and memory scheduler scoreboard. In an embodiment, these resources are allocated to a predetermined region (e.g., a cache line width such as 64 bytes) of memory. Each active request is also allocated its own entry in the request and coherency tracker, but multiple requests to the same region in memory share the same entry in the data buffer, tag array and memory scheduler scoreboard. Although it is possible for more than one request to be allocated to the same data buffer, tag array, and scheduler scoreboard entry, only one read request is scheduled to the memory controller for all outstanding read requests in the request and coherency tracker.

The request interface for all devices connects to the admit arbiter of the fabric. Isochronous devices use the deadline field of the request bus to indicate to the fabric the required latency to complete the request. The fabric sends a global timer value to all isochronous devices that are attached to the fabric. For each request to be sent to the fabric, the isochronous device, e.g., in a deadline logic, determines the required latency needed for the request to complete and adds the value to the current value of the global timer in order to create the request deadline. Different methods may be used by different isochronous devices to determine the required latency for the request, but in one embodiment, all isochronous devices indicate to the fabric the request latency using a deadline field of the request interface. In other embodiments, the uncore fabric may assign a deadline on behalf of agents that require real-time QoS. Specific methods may vary, but one example may be that by default, the uncore fabric assigns a fixed deadline of x microseconds from current time for all requests from the real-time core. In this example, x could be a value derived from a configuration register.

In an embodiment, the admit arbiter has two levels of priority. There is a high priority path in the arbiter that is used for urgent isochronous requests. A request is considered urgent if the requesting agent is configured as an isochronous agent and the deadline field of the request is less than a value stored in a configuration register specifying a threshold value, referred to as an "urgency threshold value." The admit arbiter also has a low priority path used for best effort requests and for isochronous requests that are not considered urgent. The final level of arbitration is done using a priority selector that selects between the winner of the high priority arbitration and the winner of the low priority arbitration.

In one embodiment, the admit arbiter final selector has two modes that can be selected using a configuration register. The first mode is a fixed priority mode in which, assuming at least one high priority request is present at the input of the admit arbiter, the selector chooses the winner of the high priority arbitration path before choosing the winner of the low priority arbitration path. The second mode of the final selector is a weighted round robin mode in which the final selector switches between granting the high priority path to granting the low priority path after N number of high priority requests are granted. The selector then grants M number of low priority requests from the winner of the low priority path before switching back to granting requests from the high priority path. In an embodiment, the values for N and M may be referred to as "grant counts," and are specified using configuration registers.

Figure 2:
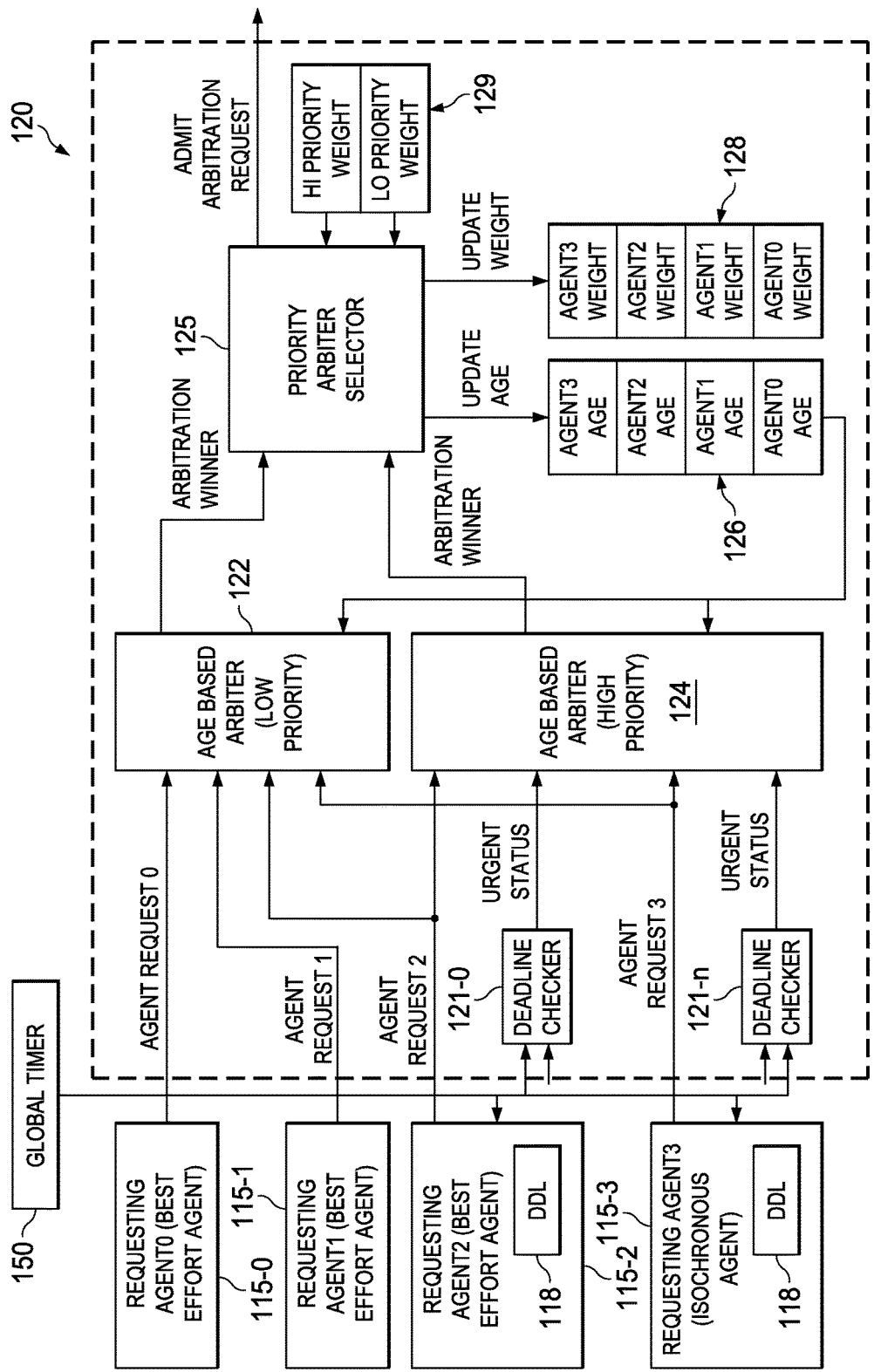
FIG. 2 is a block diagram of a further detail of an admit arbiter according to one or more examples of the present Specification.

FIG. 2 is a block diagram disclosing further details of an admit arbiter according to one or more examples of the present Specification. As shown in FIG. 2, arbiter 120 receives incoming requests from the requesting agents. In this illustration, requesting agents 115-0 and 115-1 are non-isochronous or best effort agents, while agents 115-2 and 115-3 are isochronous agents. Note that the isochronous agents may include or be coupled to deadline determination logic 118 that is used to calculate required latency for requests. In an embodiment in which at least some of the agents are third party IP blocks, this logic can be implemented in wrapper or interface logic that couples the agent to the shared memory fabric.

In the embodiment shown, admit arbiter 120 includes a first age-based arbiter 122 and a second age-based arbiter 124, which correspond to low and high priority age-based arbiters, respectively. Thus as seen, requests from all agents 115 are provided to first arbiter 122, while only requests from isochronous agents 115-2 and 115-3 are provided to second arbiter 124. To determine whether a particular request from one of the isochronous agents is of an urgent status, a pair of deadline checker logics 120-1 and 120-n, are each coupled to receive requests from a corresponding one of the isochronous agents, as well as global timing information from global timer 150. Based on a comparison of the deadline information provided by the agent and the global timing information, an indication of an urgent status for a corresponding request can be provided to second arbiter 124.

In operation, arbiters 122 and 124 operate to select an arbitration winner from a set of incoming requests. In the embodiment shown, this determination is based in part on information from an age storage 126 that stores an age value for each of the agents. The corresponding winners from each of the arbiters may be coupled to a priority arbiter selector 125 that selects based on mode of operation a corresponding request to provide to scheduler arbiter 130 (FIG. 1). To this end, selector 125 may select a request for admission to the scheduler arbiter based at least in part on information in a priority storage 129. It should be noted that the block diagram of FIG. 2 is intended to be non-limiting, and that other elements may be present in various embodiments.

Weighted Age-Based Arbitration Details

The age-based algorithm implemented by the admit arbiter is such that the requesting agent which has waited the longest since last being granted by the arbiter will be given the highest priority level. Once an agent has received the highest priority level, the priority level for that agent will not change unless that agent has been granted by the arbiter. In this way, starvation issues that may occur in certain embodiments of round robin arbitration may be avoided by ensuring that the priority level for a requesting agent can only increase in priority level until that requesting agent has been granted by the arbiter.

The admit arbiter also allows for agent weights to be assigned to all requesting agents. Weights are used to allocate a percentage of the request bandwidth for each requesting agent. In an embodiment, a weight value is specified for each agent via a value stored in an agent weight configuration register. In one non-limiting example, the percentage of request bandwidth that is allocated to an agent is equal to the agent weight value divided by the sum of weights for all agents. In another example, weight for real-time core can be higher than other cores to give better QoS for a real-time core.

Weighted Age-Based Algorithm

The admit arbiter weighted age-based algorithm is based on the relative age of when a requesting agent was last granted by the arbiter. For each requesting agent that connects to the admit arbiter, there is one age counter instantiated and one weight counter instantiated.

Both the high priority and low priority arbitration paths in the admit arbiter share common age and weight counters for the agents connected to the admit arbiter. The updating of the requesting agent's age and weight registers is determined by the final selector (namely the priority arbiter selector 125) after choosing the final arbitration winner.

In an example, the age registers (e.g., of age storage 126) for all requesting agents are first initialized responsive to receiving a reset input to the admit arbiter. When reset asserts, the age registers are initialized to unique values in a range starting at 0 and ending at a value of N−1, where the value of N equals the number of request interfaces connected to the admit arbiter.

Prior to any requests being asserted by the requesting agents, the agent weight counters (e.g., of weight storage 128) are initialized from programmed values in the agent weight configuration registers of the fabric. Once the weight counters initialize, the counter for an agent decrements by one for each request granted for that agent. Once an agent's weight counter reaches zero and if the agent is granted again by the admit arbiter, the counter is reloaded with the value programmed in the configuration register for that agent's weight.

In one embodiment, the age-based arbitration method performed in first and second arbiters 122 and 124 uses a request bit vector (each arbiter having its own vector) to determine the winner of the arbitration. When a request is asserted for an agent the arbiter uses the age value for the requesting agent as the priority level of the request. The priority levels for the arbiter and thus the range of the bit vector width is from 0 to N−1. The age-based algorithm guarantees that the age values for all requesting agents are always unique and therefore there is always only one winner per arbitration.

The arbiter updates the age registers for all agents when the weight counter for the winner of the request arbitration has reached zero. In one embodiment, the age registers for all agents are updated according to the following rules that guarantee the age values for the agents are always a unique value:

a. Rule 1: when the agent's age equals the age of the winner of the arbitration, the age register for that agent is set to zero to indicate youngest request age or lowest priority.

b. Rule 2: when the agent's age is less than the winner of the arbitration, the agent's age register is incremented by 1.

c. Rule 3: when the agent's age is greater than the winner of the arbitration, the agent's age register does not change.

Figure 3:
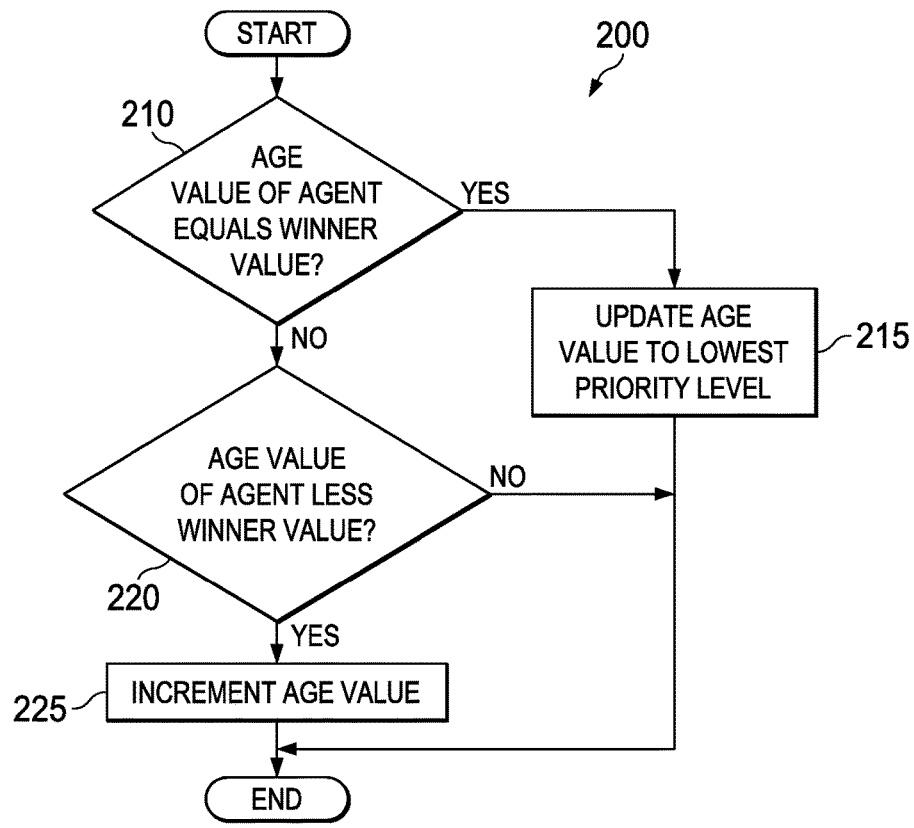
FIG. 3 is a flow diagram of a method for updating age values for an agent upon a determination of an arbitration winner according to one or more examples of the present Specification.

FIG. 3 is a flow diagram of a method for updating age values for an agent upon determining an arbitration winner according to one or more examples of the present Specification. This method may be performed in one example to update age values when the winner's weight value equals zero. As seen, method 200, which may be performed by the priority arbiter selector, begins by determining whether the age value of an agent equals the winner value (decision block 210). If so, control passes to block 215 where the age value for this winning agent can be updated to the lowest priority level, which in an embodiment may be equal to zero. From both of block 215 and decision block 210, control passes to decision block 220 where it can be determined whether the age value is less than the winner value (namely corresponding to the age of the agent). If so, control passes to block 225 where the agent's age value can be updated, e.g., incremented. If none of these conditions occur, the agent's age is greater than the winner of the arbitration, and as such the age value for this particular agent does not change. Note that method 200 can be performed for each agent at the conclusion of each arbitration round when a winner is selected. It should be noted that the flow chart of FIG. 3 is intended to be non-limiting, and that other operations may be present in various embodiments.

Figure 4:
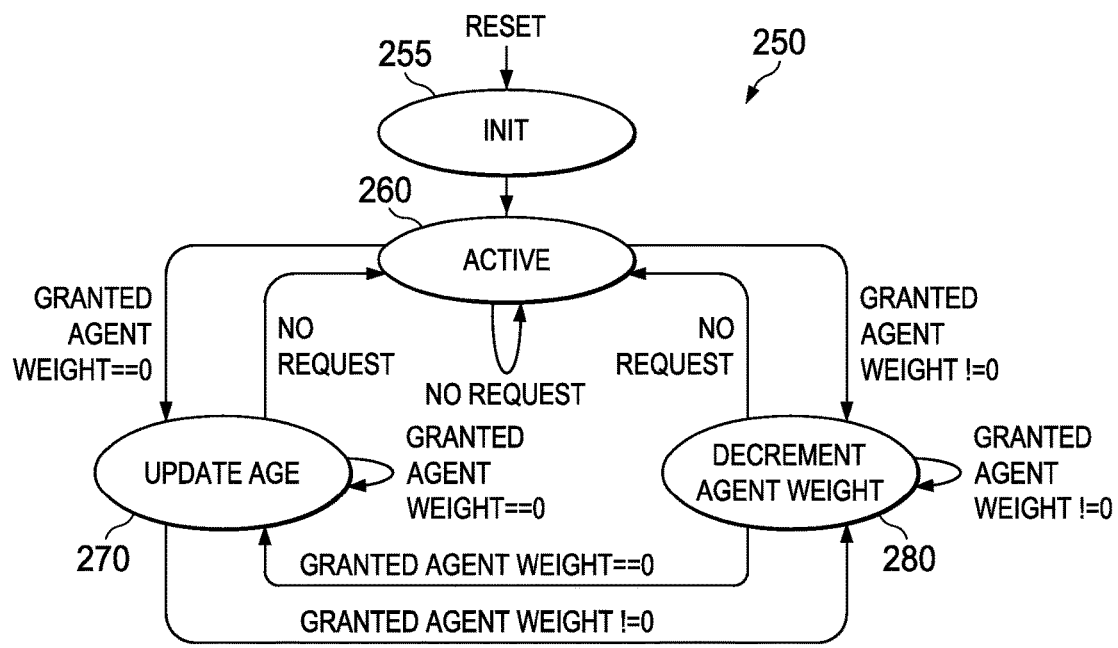
FIG. 4 is a block diagram of an admit arbiter state machine according to one or more examples of the present Specification.

FIG. 4 is a block diagram of an admit arbiter state machine according to one or more examples of the present Specification. As shown in FIG. 4, state machine 250, which may be present within admit arbiter 120 of FIG. 1, first enters into an initialization (INIT) state 255 from a reset assertion. From this state, control passes into an active state 260 in which it remains so long as no requests are received. When a request is received and a granted agent has a weight of zero, control passes to an update age state 270 in which age storages are updated and a weight counter for an arbitration winner is reloaded to a predetermined value, e.g., obtained from a configuration register. Control then passes to one of active state 260, decrement agent weight state 280, or remains at update age state 270, depending upon whether an additional request is present and a value of the granted agent's weight.

Similarly at decrement agent weight state 280, a winner arbitration weight counter is decremented. But here no weight counter reloads are performed. It should be noted that the state machine block diagram of FIG. 4 is intended to be non-limiting, and that other states and operations may be present in various embodiments.

The states and descriptions of the state machine of FIG. 4 includes the following:

| State | Description |
| --- | --- |
| Init | Reset is asserted:<br>Agent weights reloaded to values in configuration registers<br>Agent age registers set to unique Agent ID values |

-continued

| State | Description |
| --- | --- |
| Active | No Agent Requests:<br>Agent age and weight registers remain in same state |
| Decrement Age Weights | Requests asserted from one or more agents.<br>Winner of arbitration weight counter is non-zero.<br>Weight counter of winner is decremented. |
| Update Age | Requests asserted from one or more agents.<br>Winner of arbitration weight counter is zero.<br>Agent age registers updated.<br>Weight counters for winner of arbitration reload to value in configuration registers. |

Figure 5:
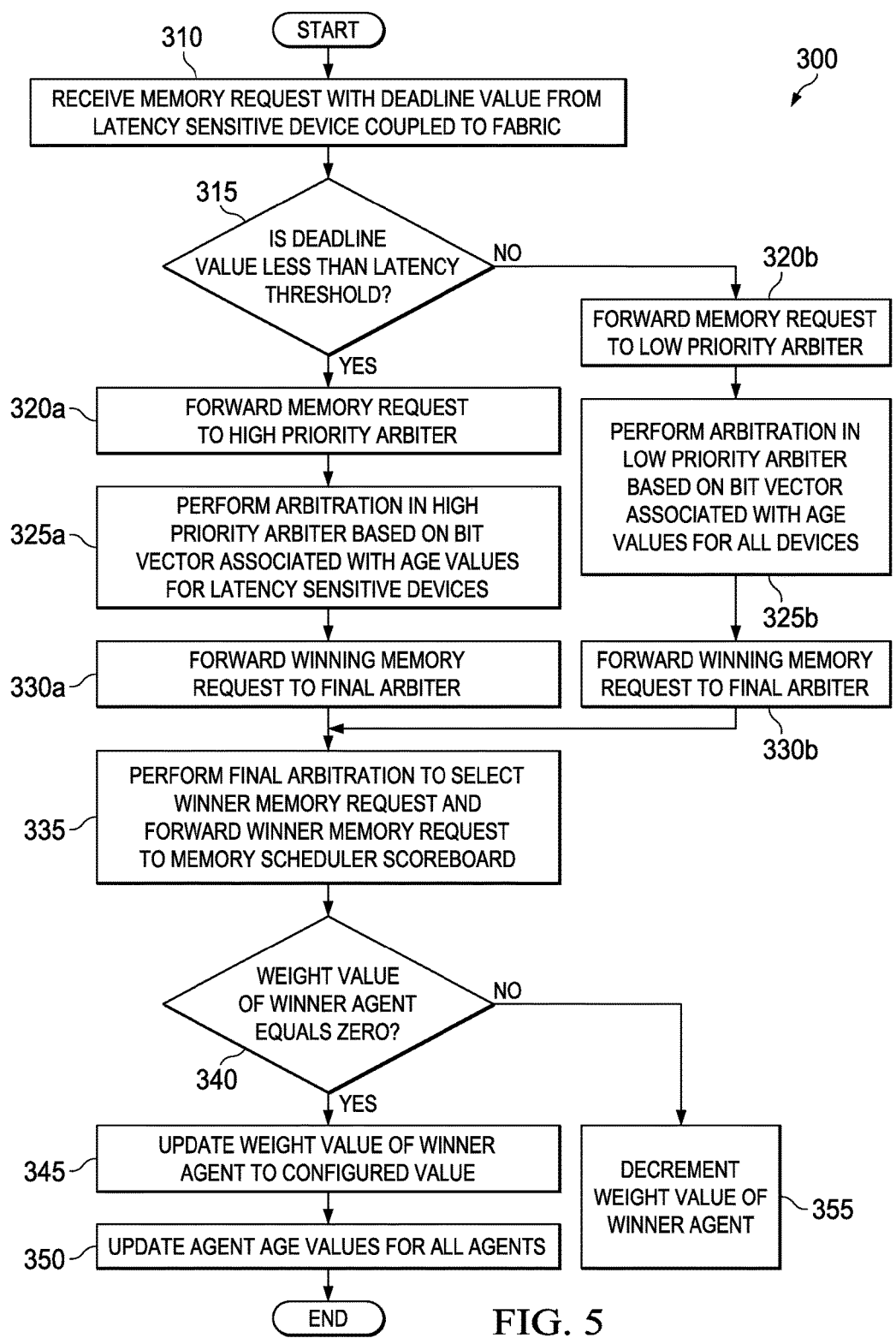
FIG. 5 is a flow diagram of a method for performing first level arbitration in an admit arbiter according to one or more examples of the present Specification.

FIG. 5 is a flow diagram of a method 300 for performing first-level arbitration in an admit arbiter according to one or more examples of the present Specification. As shown in FIG. 5, method 300 may be performed within the admit arbiter both for purposes of performing arbitration between incoming memory requests, as well as updating various age and weight values based upon an arbitration. As seen in FIG. 5, method 300 may begin by receiving a memory request from a device coupled to the fabric (block 310). More specifically to illustrate operation with regard to deadline-based requests from a latency-sensitive device, we can assume in one example that this memory request includes or is associated with a deadline value and is thus provided from an isochronous or latency-sensitive device. As one such example this latency-sensitive device is a media player. As seen, control passes to decision block 315, where it can be determined whether the deadline value is greater than a latency threshold. In an embodiment, this latency threshold is a minimum latency from the time a request is received until it is completed (e.g., by provision of requested data back to the requesting device provision of a write completion for a write request). Note that the deadline value is in one embodiment a maximum latency that the requesting device can tolerate for handling the memory request.

If it is determined that the deadline value is greater than the latency threshold, control passes to block 320b, where the memory request is forwarded to a low-priority arbiter. Otherwise control passes to block 320a, where the memory request is forwarded to a high-priority arbiter.

Note the presence of parallel paths such that at block 325 (blocks 325a and 325b), an arbitration is performed in the corresponding arbiter that is based on a bit vector associated with the age values for the devices that provide requests to the corresponding arbiter. Next at block 330 (blocks 330a and 330b), the winning memory requests are forwarded to a final arbiter. At block 335, a final arbitration is performed to select the winner memory request.

Depending upon a mode of configuration for this final arbiter, the winner request can be selected from the high priority arbiter only, or a weighting between high priority and low priority paths may occur. Thus at this point the winning memory request is forwarded to a memory scheduler scoreboard where it can be stored in an entry to thus enable arbitration in the memory scheduler arbiter to consider this memory request.

Various updating operations may further be performed responsive to selection of a winner by the final arbiter. Specifically, at decision block 340 it can be determined whether the weight value of the winner agent equals zero. If so, control passes to block 345 where this weight value can be updated to its configured value, e.g., stored in a configuration register of the shared memory fabric. Control next passes to block 350 where the age values for all agents can be updated (block 350). To this end all non-winning agents may have their age value incremented, while the winning agent may have its age value set to a lowest priority value. e.g., zero. If instead at decision block 340 it is determined that the weight value of the winner agent is not zero, control passes to block 355 where the weight value of the winner agent is decremented. It should be noted that the flow chart of FIG. 5 is intended to be non-limiting, and that other operations may be present in various embodiments.

Shared Memory Fabric Shared Resource Allocation

The memory fabric includes logic to allow for fair allocation of the shared resources within the fabric, e.g., the resource allocation logic 148 of FIG. 1. In one embodiment, these shared resources are the fabric's internal data buffer, address tag storage and request tracker scoreboards. Since there are no dedicated resources for any of the requesting agents, mechanisms may limit the number of outstanding requests that are pending in the fabric for each of the agents, while also allowing entries to be reserved for an agent, e.g., by reserving virtual entries in these shared resources. The fabric allows for the specification of agent limits to prevent any one requesting agent from using up all the available shared resources of the fabric.

A portion of the memory scheduling algorithm deals with minimizing the performance impact of read-to-write turnaround times for memory technologies. In order minimize the number of times the memory scheduler switches between scheduling read requests to scheduling write requests, a flush pool is used for queuing write requests. The flush pool allows write requests targeting memory to be accumulated in the memory fabric until enough write requests have been received to allow the fabric's memory scheduler to send the write requests to the memory controller as a burst of back-to-back requests. In order to prevent all available resource in the fabric to be used up by the flush pool, a flush limit can be specified. When specified, the flush limit causes the fabric to block new write requests from all agents at the admit arbiter until the number of entries in the flush pool is less than the value programmed for the flush pool.

Memory Fabric Flush Pool for Write Requests

When a write request is received from a requesting agent, the fabric transfers the write data from the requesting agent to an internal data buffer. Once the new data is written to the fabric's internal data buffer and the request is retired from the agent's point of view, the buffer entry is considered to be in the "flush pool". For coherent memory traffic the fabric may receive snooped requests from the requesting agents. Snooped requests can be either read or write requests to memory. When the fabric receives a snooped read or write request from a requesting agent, it sends a snoop request to all caching agents coupled to the fabric. The caching agents will respond to a snooped request that hits in their cache and will return the write back (WB) data for a cache line that has been modified by the caching agent. The WB data is then written into the fabric's internal data buffer and is then considered to be included in the flush pool of write requests targeting memory. When the number of entries in the flush pool reaches the value programmed for the flush limit, new write requests, e.g., as determined by decoding of the request opcode field, are blocked at the admit arbiter.

Memory Fabric Reservations and Limits

The memory fabric allows reservations to be specified for any agent using agent reservation configuration registers. Using these configuration registers the user can specify the number of entries in the memory fabric to reserve for each agent. The reserved entries for an agent are the first entries allocated to the agent and the last entries to be retired for the agent. In order to determine if an agent's reserved entries are being allocated or retired, each agent has a request counter that is compared against the value specified in the configuration register. If the value in the request counter is less than or equal to the value in the configuration register, the agent's reserved entries are being used.

The mechanism used to provide agents with reserved entries varies over the full threshold limit as reserved entries are allocated or freed for requesting agents. Initially, the full threshold for all agents is calculated by subtracting the total number of reserved entries for all agents (e.g., as specified by configuration registers) from the total number of entries in the scoreboards. As reserved entries are allocated to an agent, an accumulator is used to adjust the full threshold based on the total number of reserved entries that have been used. Agents that have used their reserved entries or do not have reserved entries specified are blocked when the total number of pending requests in the memory fabric reaches this adjusted full threshold. Agents that have not used their reserved entries are not blocked by the admit arbiter until they have used all their reserved entries and the total number of pending requests reaches the adjusted full threshold limit.

Agent limits may also be specified in configuration registers of the memory fabric. These agent limits may be disabled by setting the request limit for an agent to zero, in an embodiment. When agent limits are disabled any agent may be allocated all existing entries of the request tracker. In order to prevent a single agent from using all request tracker entries, a request limit can be specified for the agent. When the agent's request counter reaches the request limit specified for the agent the request input to the admit arbiter for that agent is disabled. When the request tracker retires requests for the agent and the agent's request counter becomes less than the agent's request limit, the request input to the admit arbiter for that agent is enabled.

Figure 6:
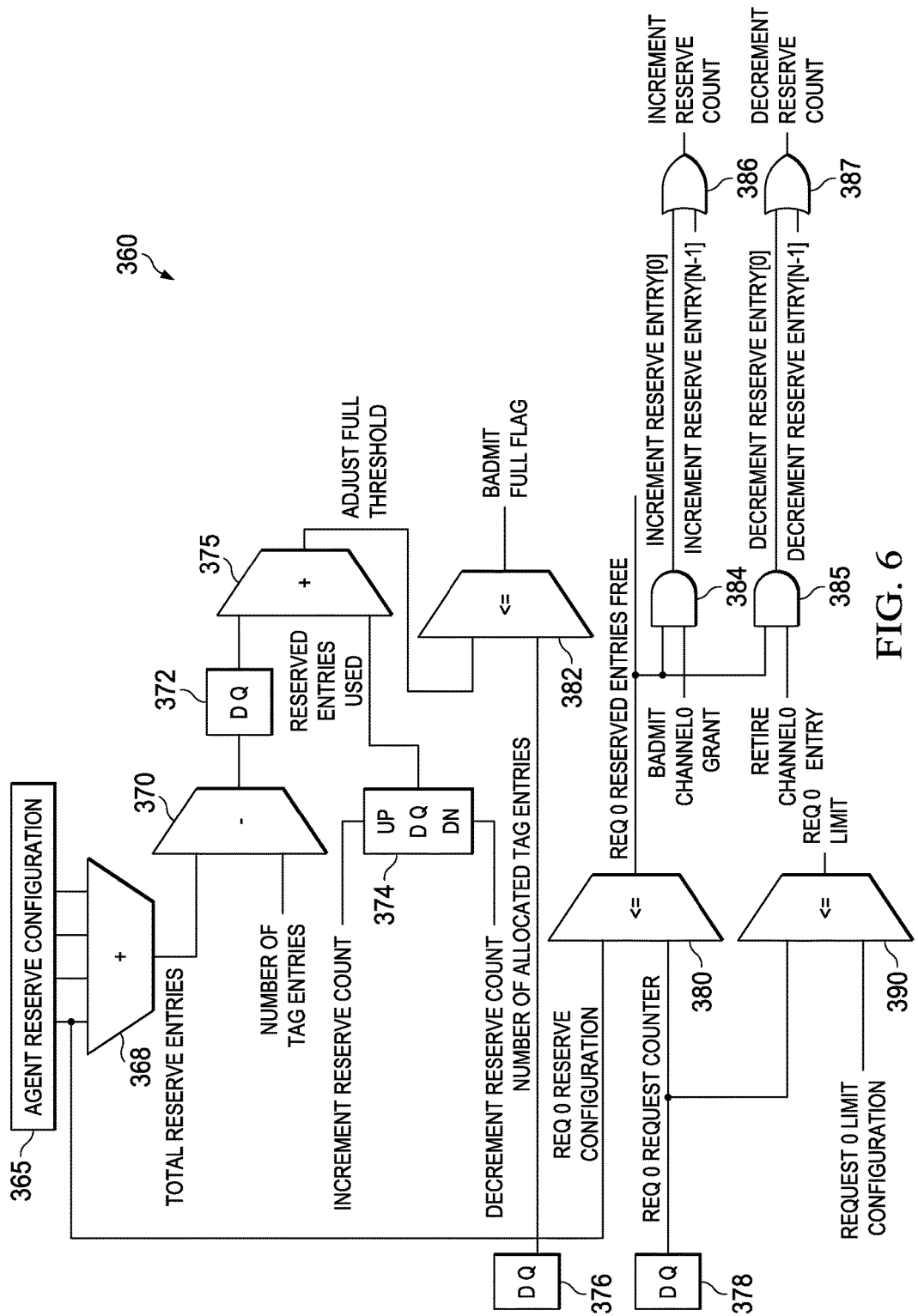
FIG. 6 is a block diagram of a portion of a resource allocation logic according to one or more examples of the present Specification.

FIG. 6 is a block diagram of a portion of a resource allocation logic according to one or more examples of the present Specification. As shown in FIG. 6, logic 360 may be used to control allocation of various resources shared between all of the agents. As seen, an adder 368 determines a total number of reserved entries based on agent reserve values received from a configuration storage 365. From this total reserve entry value, a number of tag entries are subtracted at subtracter 370. The resulting value is provided through a flip-flop 372 to an adder 375 which combines this value with a number of reserved entries used, received from flip-flop 374 that is alternately incremented and decremented based on increment and decrement reserve count values, described further below.

As such, the sum generated by adder 375 corresponds to an adjusted full threshold value that is provided to one input of a comparator 382 that further receives a number of allocated tag entries from flip-flop 376. If it is determined that the adjusted full threshold value is less than or equal to this number of allocated tag entries, a full flag is generated and used to mask requests of agents that have no reserve entries or have used their reserve entries.

As further seen, another comparator 380 is configured to receive a given requestor's reserve configuration value and a request counter value for that requestor (from flip-flop 378). The comparator thus generates an indication as to whether that requester has any free reserved entries, which is provided as an input to a pair of AND gates 384 and 385 that further receive indications of a channel grant and a retirement of an entry for that channel. As such, these AND gates thus generate, respectively the increment and decrement values for the corresponding requestor. Similar logic and operations are performed for the other requestors, with all increment and decrement reserve values being provided to corresponding OR gates 386 and 387 that respectively generate the increment reserve count value and the decrement reserve count value.

Finally, the request counter value for a requestor is provided to another comparator 390 along with a configured limit value for that requestor to thus determine whether this requestor has reached its limit. If so, an indication of this limit is used to mask off the requests from this agent for further arbitration. It should be noted that the block diagram of FIG. 6 is intended to be non-limiting, and that other operations may be present in various embodiments.

Shared Memory Fabric Scheduler Arbitration Details

Embodiments may incorporate multiple scheduling algorithms to enhance reuse across multiple SoCs that support different memory technologies. The fabric's memory scheduler logic contains advanced QoS scheduling algorithms, and is also optimized to minimize performance bottlenecks that are commonly found in most memory technologies. The typical performance bottlenecks that occur using, e.g., DRAM memories include entering and exiting of low power memory states, read-write turnaround times, consecutive memory accesses to the same DRAM bank but to different rows of memory, and consecutive memory accesses to different DRAM memory ranks By including complex out-of-order scheduling algorithms in the shared memory fabrics scheduling logic, the fabric can be adapted to many different SoCs by attaching simplified technology-specific constraint solvers to the fabric to support their unique requirements for memory technologies or configurations.

Figure 7:
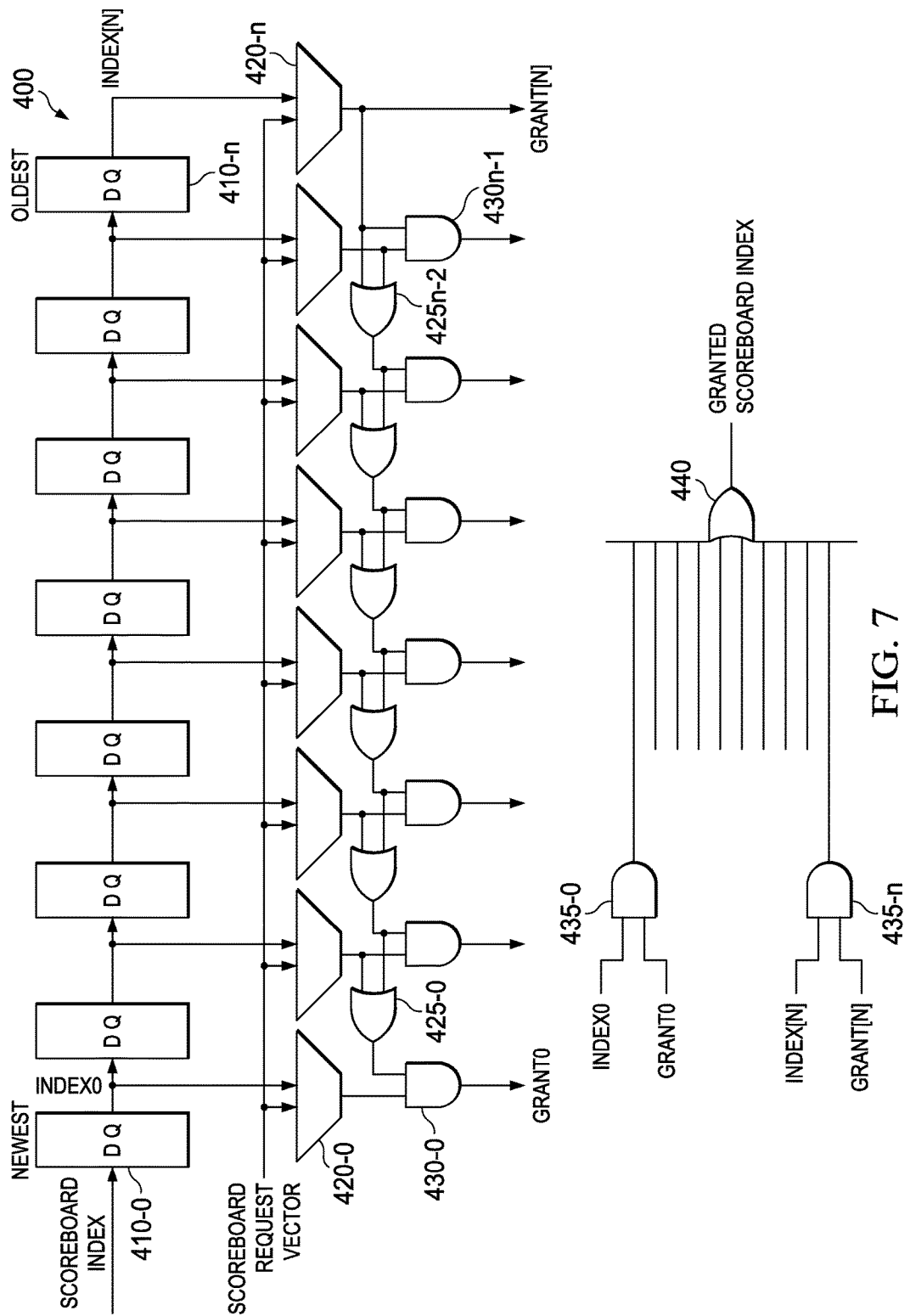
FIG. 7 is a block diagram of a scoreboard index generation logic according to one or more examples of the present Specification.
Figure 8:
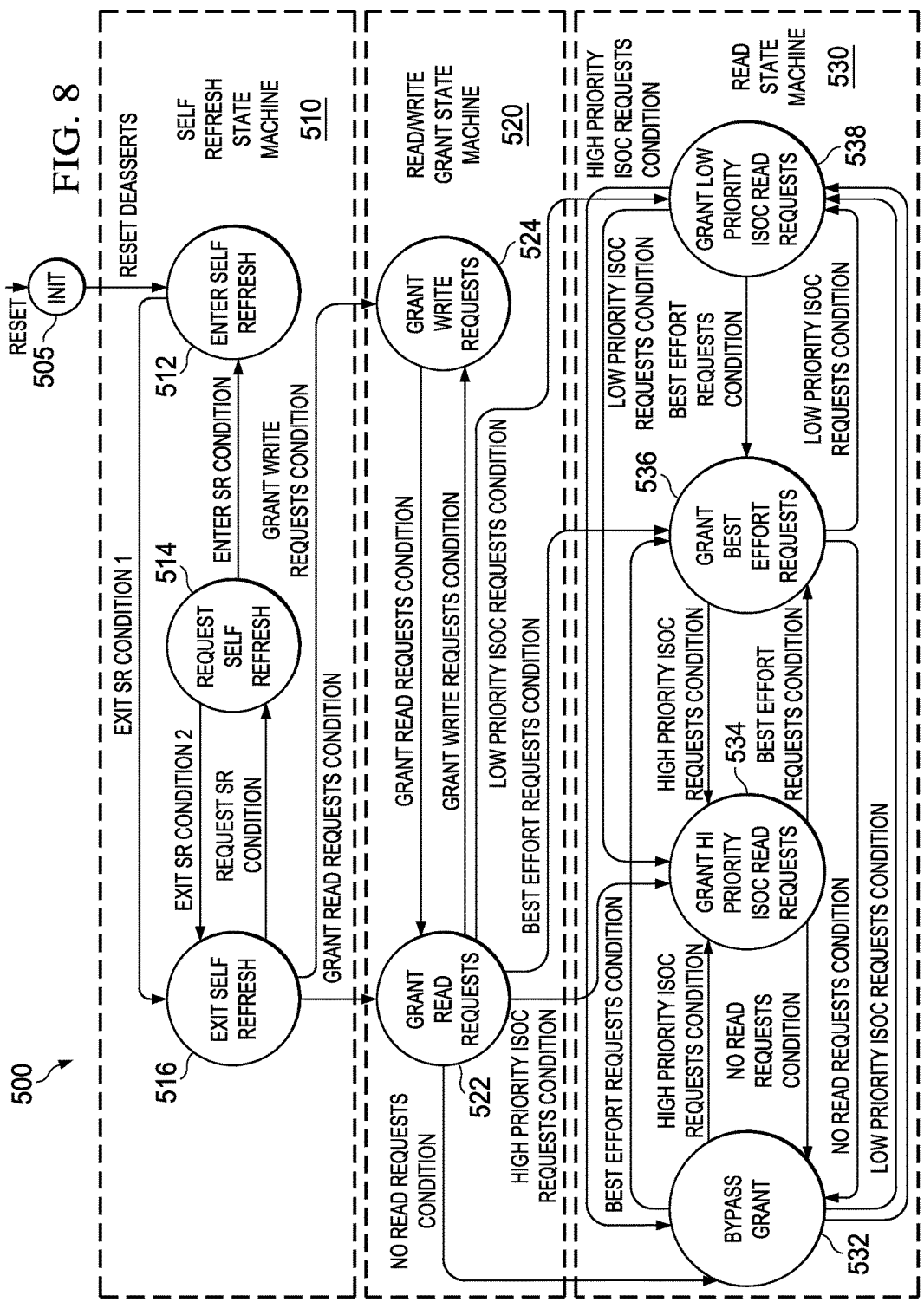
FIG. 8 is a block diagram of a state machine for a scheduler arbiter according to one or more examples of the present Specification.
Figure 9:
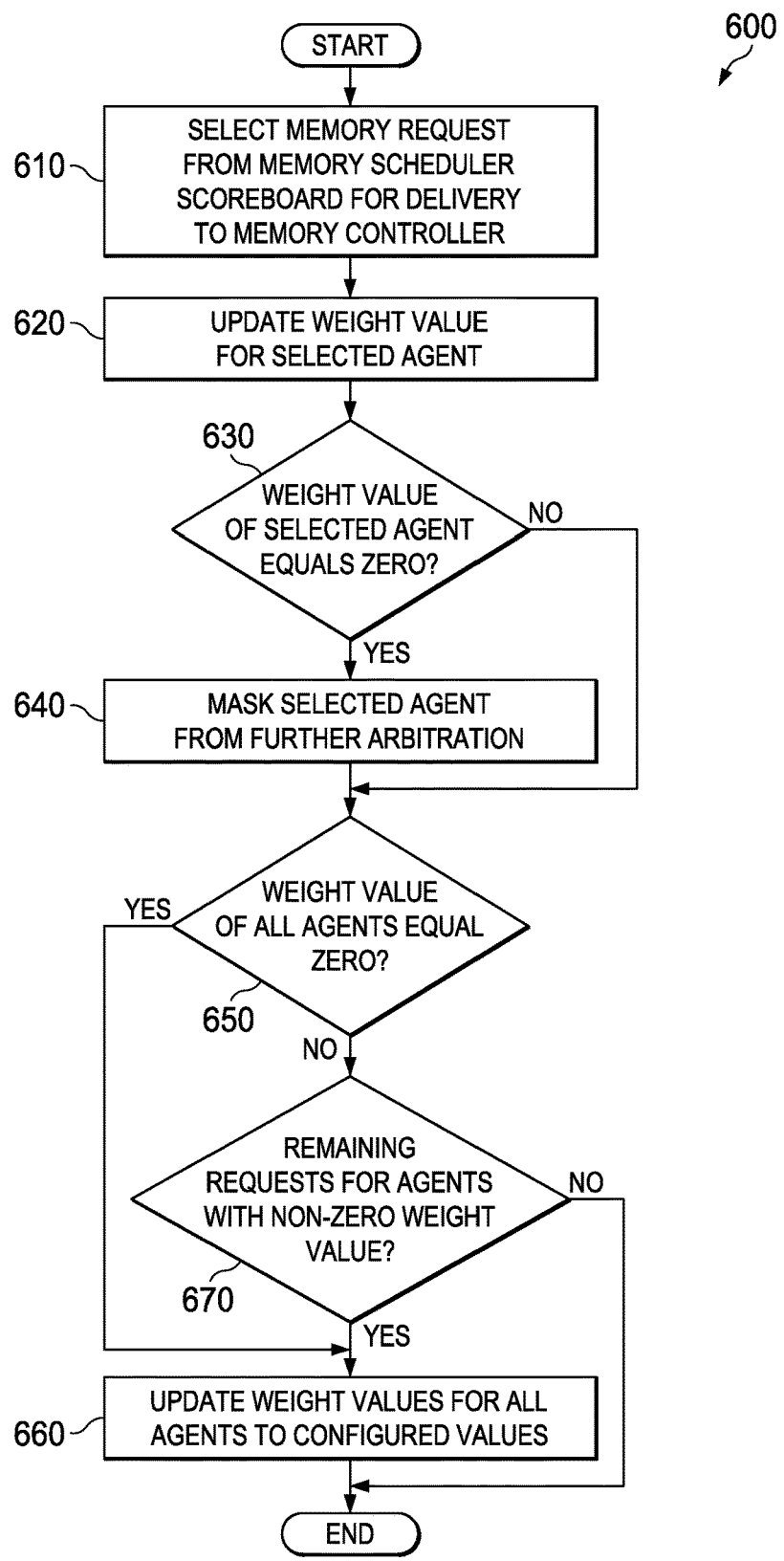
FIG. 9 is a flow diagram of a method for performing memory scheduling according to one or more examples of the present Specification.

In other embodiments, the methods described in FIGS. 7-9 may be wholly or partially replicated in memory controllers or exclusively implemented by memory controllers.

In addition to improving the portability of the memory scheduling logic, embodiments also provide predictability of memory request latency in that the combination of advanced out-of-order scheduling algorithm with QoS scheduling logic results in improved predictability of the maximum request latency, in that the memory controller has much less flexibility to reorder memory requests.

Once a request is granted by the admit arbiter, it is enqueued into the scheduler scoreboard. The scheduler scoreboard stores information about the request that it uses to forward the request to the memory controller in order to perform a read or write to memory. In one embodiment, the information includes request address, request length, command type (read or write), class of service category, memory channel, memory bank, memory rank, and page hit/miss status.

Memory Scheduler Oldest of Available Queue

Embodiments provide for out-of-order page aware scheduling that is based on a history of requests sent to the memory controller, although the fabric has no direct knowledge of the true state of the memory bank. More specifically, the fabric's memory scheduler uses the scheduler scoreboard as a history buffer of requests that have been sent to memory. Because the scheduler scoreboard is used to reflect the history of requests, it seeks to retain the status information for a request in the scoreboard as long as possible. The memory scheduler uses a structure called the oldest of available queue to determine the oldest scoreboard entry that is available to be reallocated.

The oldest of available queue is also used by the memory scheduler to avoid starvation issues that can arise due to the out-of-order scheduling of the requests to memory. The fabric's memory scheduler uses the oldest of available queue to determine how many requests of the same class of service category and type, read or write, have bypassed the oldest pending request to memory. Once the number of requests that have bypassed the oldest request reaches a preprogrammed limit (e.g., set by software) the fabric's memory scheduler disables out-of-order scheduling of requests and grants the oldest pending request.

As mentioned above, the scheduler keeps track of the relative age of all requests in its scoreboard using the oldest of available queue. When a request targeting a new memory address is granted by the admit arbiter an index pointer into the scheduler scoreboard is enqueued into the tail entry of the oldest of available queue which is then considered to be the newest request. When all pending requests have completed transferring data to/from the requesting agents and to/from the memory controllers, a scoreboard entry is available to be reallocated and can be reallocated for a new request granted by the admit arbiter. Due to the out-of-order scheduling, the oldest entry in the oldest of available queue may not always be available for reallocation.

To select the scoreboard entry to be re-allocated to a new request, the scheduler detects whether all outstanding requests to a scoreboard entry have completed. In one embodiment, the scheduler uses a request bit vector having a length equal to the number of scoreboard entries to indicate which entries are available for reallocation. A bit set to 1 in the request bit vector indicates the entry corresponding to that bit position is available for reallocation. The request bit vector is then sent to the oldest of available queue. The oldest of available queue uses the indexes stored in the queue to select the bit in the request vector corresponding to the request for that entry of the queue. Each entry of the queue is associated with a unique bit in the request vector and a "find first" function is performed starting from the oldest entry in the queue to determine the oldest available request to be reallocated. After determining the oldest available entry to be reallocated, the scoreboard index for that entry is output from the oldest of available queue.

FIG. 7 is a block diagram of scoreboard index generation logic according to one or more examples of the present Specification. As shown in FIG. 7, logic 400 includes a plurality of flip-flops 410-0-410-$n$, coupled in a serial configuration to store a corresponding scoreboard index. As seen, flip-flops 410 are configured to receive a scoreboard index corresponding to an index pointer into a scoreboard of the scheduler which is also the index to the tag array and data buffer. Flip-flops 410 may be configured in an order from newest (namely flip-flop 410-0) to an oldest (namely flip flop 410-$n$). In a non-limiting example, each flip flop may be a D-type flip-flop. In other embodiments, any suitable storage element may be used.

As seen, an output of each flip-flop 410 is coupled to one of a corresponding plurality of multiplexer 420-0-420-$n$, each of which is further configured to receive a bit of a scoreboard request vector. As such, this bit vector provides an indication. e.g., via a set bit to indicate that a corresponding scoreboard entry is available for reallocation. Using the outputs from multiplexers 420, a grant signal can be generated either directly from the comparator output (as from comparator 420-$n$) or via a corresponding one of logic gates 430-0-430-$n$ (which in the embodiment shown are configured as AND gates having a first input received from a corresponding multiplexer 420 and a second input corresponding to an inverted output of a corresponding OR gate 425-0-425-(n−2)). In this way only a single one of the grant signals may be active at a time.

As further seen in FIG. 7, the grant output signals may be coupled to a corresponding one of a plurality of AND gates 435-0-435-n, also configured to receive an incoming index signal. In turn the outputs from AND gates 435 may be coupled to an OR gate 440 to thus output a scoreboard index corresponding to the oldest available entry such that a "1-hot" multiplexer function is performed to provide a "one hot" multiplexing of the scoreboard index of the granted request. It should be noted that the block diagram of FIG. 7 is intended to be non-limiting, and that other elements may be present in various embodiments.

Shared Memory Fabric Memory Scheduling Details

In an example, the fabric memory scheduler contains three state machines that work together to schedule requests sent to the memory controller.

FIG. 8 is a block diagram of a state machine for a scheduler arbiter according to one or more examples of the present Specification. As shown in FIG. 8, state machine 500, which may be performed in hardware, software and/or firmware such as scheduler arbiter 130 of FIG. 1, may begin by entering into an initialization state INIT upon reset of the system. Control next passes into a self-refresh state machine 510 that includes an "enter" self-refresh state 512, a "request" self-refresh state 513, and an "exit" self-refresh state 516.

As seen in FIG. 8 from exit self-refresh state 516, control passes into a "read/write" grant state machine 520 that in turn includes a "grant read request" state 522 and a "grant write request" state 524. From these states control in turn passes into a "read" state machine 530 that includes a plurality of states, namely a "bypass grant" state 532, a "high priority read request" grant state 534, a "best effort" grant read request state 536, and a "low priority" isochronous grant read request state 538. It should be noted that the block diagram of FIG. 8 is intended to be non-limiting, and that other elements and modifications may be present in various embodiments.

Self-Refresh State Machine

Embodiments may control when the memories are allowed to enter and exit the low power memory state, also referred to as the self-refresh state. The self-refresh state machine is responsible for controlling when to send an indication to the memory controller to enter or exit self-refresh. For best effort read requests, the self-refresh state machine transitions immediately to the exit self-refresh state. For isochronous read requests, the memory scheduler checks the request deadline to determine if it is to exit self-refresh in order to satisfy the required read latency for the request. To determine if exiting self-refresh is required for meeting the isochronous read requirement, the memory scheduler subtracts the deadline of the request from the current value of the global timer. The result of the subtraction is checked against a configuration register in the fabric that is programmed to reflect the worst case latency needed for the memory controller to exit self-refresh and the fabric to return data to the request agent.

For write requests, the fabric counts the number of dirty entries in the flush pool and checks the result against a programmable threshold value, termed the flush high water mark. If the number of dirty entries exceeds the value of the flush high water mark, the self-refresh state machine passes control to the exit self-refresh state. In addition, the fabric checks for read/write conflicts to the same tag address in which the request is blocked by the admit arbiter. When the fabric determines that a request is blocked by an address conflict, agent limit or if the request tracker or memory scheduler scoreboards are full, control passes from the self-refresh state machine to the exit self-refresh state. The fabric also contains a configuration register that can be programmed to disable entering self-refresh, in an embodiment.

When the memory scheduler sends an indication to the memory controller to exit self-refresh, requests may begin to be sent to the memory controller. The memory scheduler continues to send an indication to the memory controller to remain out of self-refresh while it is actively sending memory requests to the memory controller. When the memory scheduler completes sending all read requests to the memory controller and the number of write requests in the flush pool is below the casual high water mark limit, the memory scheduler transitions to the request self-refresh slate.

In the request self-refresh state if no new requests are granted by the admit arbiter the state machine transitions to the "enter self-refresh" state after a programmable delay value called the "enter self-refresh delay" is met. In an embodiment, this delay is programmed in configuration registers in the fabric. If new requests are granted by the admit arbiter, the self-refresh state machine may transition to the "exit self-refresh" state under certain conditions. If a new best effort read request is received or if a write request is received that results in the number of entries in the flush pool exceeding the number programmed in the flush high water mark configuration register, the self-refresh state machine transitions from the request self-refresh state back to the exit self-refresh state. If an isochronous read request is received when the state machine is in the request self-refresh state, the deadline value of the request is checked against a programmed value called the "enter self-refresh" threshold. If the deadline latency is greater than the enter-self-refresh threshold, the state machine continues in request sell-refresh state if the deadline latency for a request is below the enter self-refresh threshold, the state machine will transition to the exit self-refresh state.

The self-refresh state machine drives status to the memory controller to remain out of self-refresh until the state machine transitions to the enter self-refresh state. Once in the enter self-refresh state, the state machine sends an indication to the memory controller to enter self-refresh.

Table 2 below is a description of a self-refresh state machine in accordance with an embodiment of the present Specification.

| Current State | Condition | Description | Next State | Outputs |
|---|---|---|---|---|
| Unknown | Reset | Reset pin asserted | Enter Self Refresh | Fabric drives indication to memory controller to enter self refresh |
| Enter Self Refresh | Memory Scheduler Idl | Number of flush entries less than Flush HWM and no Best Effort Read Requests and no ISOC read requests with deadline times less than Exit Self Refresh Threshold | Enter Self Refresh | Fabric drives indication to memory controller to enter self refresh |
| Enter Self Refresh | Exist Self Refresh 1 | Number of flush entries greater than Flush HWM or Best | Exit Self Refresh | Fabric drives indication to memory |

| Current State | Condition | Description | Next State | Outputs |
|---|---|---|---|---|
| | | Effort Read Requests or ISOC read requests with deadline times less than Exit Self Refresh Threshold or ISOC read request blocked by Agent Limit or Fabric Scoreboard full indications | | controller to exit self refresh. |
| Exit Self Refresh | Memory Scheduler Active | Isochronous or Best Effort read requests pending or number of Flush Pool entries above Casual HWM | Exit Self Refresh | Fabric drives indication to memory controller to Exit Self Refresh |
| Exit Self Refresh | Request Self Refresh | No Isochronous or Best Effort read requests pending and number of Flush Pool entries is below Casual HWM | Request Self Refresh | Fabric drives indication to memory controller to Exit Self Refresh |
| Request Self Refresh | Exit Self Refresh 2 | Received Isochronous read request with deadline less than Enter Self Refresh Threshold or Received Best Effort Read request spending number of Flush Pool, entries is now above Flush HWM | Exit Self Refresh | Fabric drives indication to memory controller to Exit Self Refresh |
| Request Self Refresh | Request Self Refresh | No Best Effort read requests received and number of Flush Pool entries is blow Flush HWM and Enter Self Refresh timer is greater than Enter Self Refresh Delay value | Enter Self Refresh | Fabric drives indication to memory controller to Enter Self Refresh |

Read/Write Grant State Machine

In an embodiment, the memory scheduler uses configurable threshold values to specify when to start and stop transferring a burst of write requests to the memory controller. The memory scheduler may perform different types of transfers of write data to memory. e.g., a high priority transfer and a low priority transfer, also termed herein as a high priority flush of write requests and casual flush of write requests to memory, respectively. When the number of entries in the flush pool reaches or exceeds a threshold value (the flush high water mark), the memory scheduler begins scheduling a high priority write flush to memory and begins sending write requests to the memory controller. The memory scheduler continues to schedule write requests using the high priority flush mechanism until the number of entries in the flush pool reaches or is less than a threshold value (the flush low water mark).

A casual flush may also be performed by the fabric memory scheduler. A casual flush is triggered when the memory scheduler has completed sending all read requests to the memory controller and the number of entries in the flush pool exceeds a threshold value (the casual flush limit). In an embodiment, the casual flush limit can be typically set lower than the high water mark, but greater than or equal to the low water mark, for performance reasons. In some cases this casual flush limit can be set to 0 to flush all write data to memory. Once the last read request is sent to the memory controller, if the number of entries in the flush pool is above the casual flush limit, a counter called the casual flush timer starts incrementing every' clock cycle. If no new read requests to memory are received by the fabric and the casual flush timer reaches the value specified by the casual flush delay, which is a threshold stored in a configuration register, the memory scheduler begins sending write requests to the memory controller. This casual flush continues until the number of entries in the flush pool is less than the casual flush limit or until a new read request is received by the fabric.

The read/write grant state machine is responsible for switching from granting read requests to granting write requests. In an embodiment, the memory scheduler is configurable to allow write requests to have priority over read requests or to use weights when switching between read requests and write requests (in order to prevent starvation of reads when the system is saturated by write requests). When weights are enabled, the memory fabric uses configuration registers to specify the read and write weights independently.

Table 3 below is a description of a read/write grant state machine in accordance with an embodiment of the present Specification.

| Current State | Condition | Description | Next State | Outputs |
|---|---|---|---|---|
| Unknown | Reset | Reset Pin asserted | Grant Read Requests | Memory scheduler sends Read Requests to Memory Controller |
| Grant Read Requests | Grant Read Requests | Number of flush entries less than Flush HWM and read/write weights disabled or number of flush entries is greater than HWM and read/write weights enabled and read weight count is greater than 0 | Grant Read Request | Memory scheduler sends read requests to memory controller |
| Grand Read Request | Grant Write Request | Number of flush entries greater than Flush HWM and read/write weights disabled or number of flush entries is greater than HWM and Read/Write weights enabled and read weight count is equal to 0 or no read requests pending and number of flush entries is greater than casual HWM and casual timer has expired | Grant Write Requests | Memory scheduler sends write requests to memory controller |
| Grant Write Request | Grant Write Request | Number of flush entries greater than Flush HWM and read/write weights disabled or number of flush entries is greater than LWM and read/write weights enabled and write count is greater than 0 | Grant Write Request | Memory scheduler sends write requests to memory controller |
| Grant Write | Grant Read | Pending read requests and | Grant Read Request | Memory scheduler |

-continued

| Current State | Condition | Description | Next State | Outputs |
|---|---|---|---|---|
| Requests | Requests | number of flush entries less than Flush LWM or pending read requests and number of flush entries is greater than LWM and read/write weights enabled and write weight count is equal to 0 | | sends read requests to memory controller |

Read State Machine

The read state machine is responsible for switching between high priority isochronous read requests, best effort read requests and low priority isochronous read requests. The read state machine can be configured to operate in one of multiple modes. In one embodiment, two such modes are provided. A first mode is a fixed priority mode where the read state machine gives high priority isochronous reads highest priority, best effort read requests medium priority, and low priority isochronous read requests receive the lowest priority. A second mode is to enable the use of weights for switching between high priority isochronous reads and best effort read requests. In this mode, low priority isochronous requests are only granted when there are no longer any high priority isochronous or best effort read requests.

Table 4 is a description of a read state machine according to the present Specification.

| Current State | Condition | Description | Next State | Outputs |
|---|---|---|---|---|
| Unknown | Reset | Reset Pin Asserted | Bypass Grant | Enable Bypass path from output of Admit Arbiter to Memory controller |
| Bypass Grant | No Read Request | No Read Requests Pending In Scheduler | Bypass Grant | Enable Bypass path from output of Admit Arbiter to Memory controller |
| Bypass Grant | High Priority ISOC Requests | Out of Self Refresh and High Priority ISOC Requests Pending | Grant High Priority ISOC Requests | Memory Scheduler Sends High Priority Read requests to Memory controller |
| Bypass Grant | Best Effort Requests | Out of Self Refresh and No High Priority ISOC Requests and Best Effort Requests pending | Grant Best Effort Requests | Memory Scheduler Sends Best Effort Read requests to Memory controller |
| Bypass Grant | Low Priority ISOC Requests | Out of Self Refresh and No High Priority ISOC Requests and No Best Effort Requests and Low Priority ISOC Requests Pending | Grant Low Priority ISOC Requests | Memory Scheduler Sends Low Priority Read requests to Memory controller |
| Grant High Priority ISOC Requests | High Priority ISOC Requests | Out of Self Refresh and High Priority ISOC Requests Pending and ISOC Weights not equal 0 | Grant High Priority ISOC Requests | Memory Scheduler Sends High Priority Read requests to Memory controller |
| Grant High Priority ISOC Requests | Best Effort Requests | Out of Self Refresh and No High Priority ISOC Requests Pending and ISOC Weights equal 0 and Best Effort Requests pending | Grant Best Effort Requests | Memory Scheduler Sends Best Effort Read requests to Memory controller |
| Grant High Priority ISOC Requests | Low Priority ISOC Requests | Out of Self Refresh and No High Priority ISOC Requests and No Best Effort Requests and Low Priority ISOC Requests Pending | Grant Low Priority ISOC Requests | Memory Scheduler Sends Low Priority Read requests to Memory controller |
| Grant High Priority ISOC Requests | No Read Requests Pending | Out of Self Refresh and No High Priority ISOC Requests and | Bypass Grant | Enable Bypass path from output of Admit |

-continued

| Current State | Condition | Description | Next State | Outputs |
|---|---|---|---|---|
| | | No Best Effort Requests and No Low Priority ISOC Requests | | Arbiter to Memory controller |
| Grant Best Effort Requests | Best Effort Requests | Out of Self Refresh and No High Priority ISOC Requests or ISOC Weights equal 0 and Best Effort Requests Pending | Grant Best Effort Requests | Memory Scheduler Sends Best Effort Read requests to Memory controller |
| Grant Best Effort Requests | High Priority ISOC Requests | Out of Self Refresh and High Priority ISOC Requests Pending and ISOC Weights not equal 0 or BE weights equal 0 | Grant High Priority ISOC Requests | Memory Scheduler Sends High Priority Read requests to Memory controller |
| Grant Best Effort Requests | Low Priority ISOC Requests | Out of Self Refresh and No High Priority ISOC Requests and No Best Effort Requests and Low Priority ISOC Requests Pending | Grant Low Priority ISOC Requests | Memory Scheduler Sends Low Priority Read requests to Memory controller |
| Grant Best Effort Requests | No Read Requests Pending | Out of Self Refresh and No High Priority ISOC Requests and No Best Effort Requests and No Low Priority ISOC Requests | Bypass Grant | Enable Bypass path from output of Admit Arbiter to Memory controller |
| Grant Low Priority ISOC Requests | High Priority ISOC Requests | Out of Self Refresh and High Priority ISOC Requests Pending | Grant High Priority ISOC Requests | Memory Scheduler Sends High Priority Read requests to Memory controller |
| Grant Low Priority ISOC Requests | Best Effort Requests | Out of Self Refresh and No High Priority ISOC Requests and Best Effort Requests pending | Grant Best Effort Requests | Memory Scheduler Sends Best Effort Read requests to Memory controller |
| Grant Low Priority ISOC Requests | Low Priority ISOC Requests | Out of Self Refresh and No High Priority ISOC Requests and No Best Effort Requests and Low Priority ISOC Requests Pending | Grant Low Priority ISOC Requests | Memory Scheduler Sends Low Priority Read requests to Memory controller |
| Grant Low Priority ISOC Requests | No Read Requests Pending | Out of Self Refresh and No High Priority ISOC Requests and No Best Effort Requests and No Low Priority ISOC Requests | Bypass Grant | Enable Bypass path from output of Admit Arbiter to Memory controller |

Scheduler Agent Weights

The memory scheduler uses agent weights for proportioning memory bandwidth between agents within the same class of service category. In an embodiment, configuration registers specify the weight value for each requesting agent, and a weight counter is provided for each agent. The agent weight configuration registers are common between the admit arbiter and the memory scheduler.

When there are no requests pending in the memory scheduler for any of the agents connected to the fabric, the agent weight counters are loaded with values specified in the agent weight configuration registers. When requests are granted by the admit arbiter and enqueued into the memory scheduler scoreboard, an agent ID field is stored in the memory scheduler scoreboard along with the request information. When the memory scheduler grants a request in its scoreboard, the agent ID field is used to determine the source of the request and the weight counter for that agent is decremented by one. Once an agent's weight counter has reached zero, the remaining requests for that agent are masked and no longer take part in the scheduler arbitration. When an agent is masked from arbitration due to its weight counter reaching zero, the memory scheduler continues to schedule requests from the remaining agents. Once the weight counters for all agents have reached zero or if an agent's weight counter is non-zero but there are no remaining requests for that agent, all agent weight counters are reloaded with the values from agent weight configuration registers.

FIG. 9 is a block diagram of a method for performing memory scheduling according to one or more examples of the present Specification. As shown in FIG. 9, method 600 may be performed by a scheduler arbiter of the shared memory fabric. As seen, method 600 may begin by selecting a memory request from the memory scheduler scoreboard for delivery to a memory controller (block 610). Various considerations may be taken into account in determining the appropriate entry including state of the memory, state of the various requests, relationship between address locations of the pending requests and so forth. Next at block 620 the weight value for the selected agent is updated. In an embodiment a decrementing of the weight value is performed. Note that while the initial value for the weight value for the agents is the same as obtained from the configuration register also used by the admit arbiter, understand that different weight counters are provided for each arbiter to enable independent control of these weight values.

Still referring to FIG. 9, next at decision block 630 it can be determined whether the weight value of the selected agent is equal to zero. Note that in one non-limiting example, this determination may be in an embodiment in which zero is the lowest priority value. If it is determined that the weight value is zero, control passes to block 640 where this selected agent is masked from further arbitration within the memory scheduler.

From both of decision blocks 630 and 640, control passes to decision block 650 where it can be determined whether the weight value of all agents equals zero. If so, control passes to block 660 where the weight values for all the agents can be updated to their configured values, e.g., obtained from a configuration register of the fabric. Otherwise, control passes from decision block 650 to decision block 670 to determine whether there are any remaining requests in the memory scheduler for agents having a non-zero weight value. If so, those requests can be handled. e.g., via another iteration of method 600. Otherwise if no additional requests remain, control passes to block 660 where the weight values can be updated as described. It should be noted that the flow diagram of FIG. 9 is intended to be non-limiting, and that other elements and modifications may be present in various embodiments.

Table 5 below provides example operation of memory scheduling for plurality of clock cycles, based on initial weight values for three agents as follows:

TABLE 5

| Clock Cycle | Agent 0 Req | Agent 0 Req Mask | Agent 0 Weight Counter | Agent 1 Req | Agent 1 Req Mask | Agent 1 Weight Counter | Agent 2 Req | Agent 2 Req Mask | Agent 2 Weight Counter | Reload Agent Weights | Agent Grant |
|---|---|---|---|---|---|---|---|---|---|---|---|
| 1 | False | False | 4 | False | False | 2 | False | False | 1 | True | No Grant |
| 2 | True | False | 4 | True | False | 2 | True | False | 1 | False | Grant Agent 1 |
| 3 | True | False | 4 | True | False | 1 | True | False | 1 | False | Grant Agent 2 |
| 4 | True | False | 4 | True | False | 1 | True | True | 0 | False | Grant Agent 0 |
| 5 | True | False | 3 | True | False | 1 | True | True | 0 | False | Grant Agent 0 |
| 6 | True | False | 2 | True | False | 1 | True | True | 0 | False | Grant Agent 1 |
| 7 | True | False | 2 | True | True | 0 | True | True | 0 | False | Grant Agent 0 |
| 8 | True | False | 1 | True | True | 0 | True | True | 0 | True | Grant Agent 0 |
| 9 | True | False | 4 | True | False | 2 | True | False | 1 | False | Grant Agent 0 |
| 10 | True | False | 3 | True | False | 2 | True | False | 1 | False | Grant Agent 0 |
| 11 | True | False | 2 | True | False | 2 | True | False | 1 | False | Grant Agent 1 |
| 12 | True | False | 2 | True | False | 1 | True | False | 1 | False | Grant Agent 2 |
| 13 | True | False | 2 | True | False | 1 | True | True | 0 | False | Grant Agent 0 |
| 14 | True | False | 1 | True | False | 1 | True | True | 0 | False | Grant Agent 0 |
| 15 | True | True | 0 | True | False | 1 | True | True | 0 | True | Grant Agent 1 |
| 16 | True | False | 4 | True | False | 2 | True | False | 1 | False | Grant Agent 0 |
| 17 | True | False | 3 | True | False | 2 | True | False | 1 | False | Grant Agent 1 |
| 18 | True | False | 3 | True | False | 2 | True | False | 1 | False | Grant Agent 0 |

Agent0 Weight = 4
Agent1 Weight = 2
Agent2 Weight = 1

Out of Order Page Aware Scheduling

The memory scheduler reorders requests sent to the memory controller and seeks to optimize the stream of requests for the maximum memory bandwidth possible. The memory scheduler contains configuration registers programmed to provide the scheduler with information about the memory controller to which it is attached. In one embodiment, these configuration registers include information about what address bits are used for the memory channel, bank, rank and row addresses. Using the memory configuration information programmed in the configuration registers the memory scheduler determines the bank, rank, row, and channel of each request in the scheduler scoreboard. The memory scheduler scoreboard also contains a page hit status bit for each request that is used to optimize requests sent to the memory controller so that requests to the same page in memory are sent to the memory controller before sending request to a different page.

After initialization and before any requests are sent to the memory controller, the memory scheduler clears all page hit status bits in its scoreboard. As requests are sent to the memory controller the memory scheduler updates the page hit status bits in the scoreboard to indicate whether other requests are to the same page or to a different page in memory. Although the scheduler is not aware of the actual state of the page in a given memory bank, these page hit status bits may be used as a hint as to which requests are the best candidates to send to the memory controller for optimal memory bandwidth.

When a request is sent to the memory controller, the memory scheduler compares the channel, rank and bank information for all other requests pending in the scoreboard. If the channel, rank and bank information of a scoreboard entry matches a request that is sent to the memory controller the row address of the entry is compared against the row address of the request sent to the memory controller. If the row address of a scoreboard entry matches for the request the page hit status bit is set to 1; if the row address does not match the request the page hit status bit is set to 0 indicating a page miss. For scoreboard entries where the channel, rank or bank bits are different than the request sent to the memory controller, no update of the page hit status occurs.

As new requests are granted by the admit arbiter and enqueued into the scheduler scoreboard, the row address information is compared against all entries currently in the scoreboard. If the row address of the new request matches one or more entries in the scheduler scoreboard and the page hit status bit of any matching entries is set, the page hit status for the new request is also set. If the row address does not match any entries in the scoreboard or all entries it matches have the page hit status set to zero, the page hit status for the new request is also set to zero.

Using the page hit and rank status information stored in the scheduler scoreboard, the memory scheduler reorders requests sent to the memory controller based on a priority encoded scheduling scheme that has been determined to provide optimal bandwidth for most DRAM-based memory technologies. The memory scheduler grants higher priority requests before granting requests with lower priority levels.

Table 6 below shows the different priority levels used by a memory scheduler in accordance with one embodiment of the present Specification.

| Memory Scheduler Page Aware Scheduling Priority | | |
|---|---|---|
| Pagehit Status | Rank Status | Priority Level |
| Pagehit | Same Rank | Priority Level 3 (Highest) |
| Pagehit | Different Rank | Priority Level 2 |
| Pagemiss | Same Rank | Priority Level 1 |
| Pagemiss | Different Rank | Priority Level 0 (Lowest) |

Age Based Memory Scheduling and Starvation Prevention

In order to prevent starvation of requests due to the out-of-order page aware scheduling algorithm, the concept of age is used at least in part to schedule requests. For each class of service (COS) category, the memory scheduler contains a configuration register to specify an out-of-order (OOO) scheduling limit. To provide a shorter maximum read latency for the isochronous COS category, the OOO scheduling limit is typically set to a smaller value than the OOO scheduling limit of the best effort COS category. The memory scheduler creates a request hit vector for all pending requests in its scoreboard for the best effort and isochronous COS categories. These request bit vectors are sent to the oldest of available queue, which determines the oldest request that is still pending. The oldest of available queue outputs a one hot encoded bit vector with the bit set to 1 to indicate the oldest request. As the memory scheduler grants requests OOO based on its page aware scheduling algorithm, the memory scheduler counts how many requests were granted that were not the oldest pending request for each COS category. Once the counter reaches the OOO scheduling limit for the COS category, which may be determined by performance analysis done for worst case acceptable latency for a COS category, the page aware scheduling logic is disabled and the oldest request for the COS category is granted by the memory scheduler. Any time the oldest request for a COS category is granted, the counter for that COS category is reset to zero. To provide the lowest possible latency for a COS category the OOO scheduling limit can be programmed to zero, essentially disabling the page aware scheduling logic for that COS category. When the OOO scheduling limit is set to zero for a COS category, requests to memory may be scheduled using request age, which is determined by the oldest of available queue.

Best Effort Maximum Latency Starvation Prevention

For best effort read requests, the fabric utilizes the deadline storage information in the scheduler scoreboard to store a value that is used to specify a maximum latency value for scheduling best effort requests. The scoreboard is a pool of entries and a request stored in the scoreboard may be either a best effort or isochronous request determined by the request's class of service category, also stored in the scoreboard for each request. In the case a request in the scoreboard is a best effort read request, a maximum allowable latency. e.g., a preprogrammed value stored in a configuration register, is used to schedule the request. When the request is enqueued in the scoreboard and is a best effort read request the maximum latency value is added to the current value of the global timer. Once the global timer reaches the value stored for the best effort requests' maximum latency, page aware scheduling is ignored for the request and results in the request being scheduled when it is the oldest request pending. e.g., as determined by the oldest of available queue.

Request Tracker Write Priority and Weights

The request tracker is responsible for the transfer of data from the requesting agents to the internal memory buffer of the fabric. The write protocol used by the shared memory fabric causes all write data to be transferred in request order from the requesting agent to the internal memory buffer in the fabric. In one embodiment, the request tracker uses separate linked lists per agent to preserve the ordering of the write requests. The request tracker may perform coherency checks for a write request prior to transferring data from the requesting agent to the internal data buffer.

For write requests, the request tracker may be configured to support one or more priority levels. When a request is granted by the admit arbiter the deadline information for the request is stored in an array having a length corresponding to the number of entries in the request tracker. The fabric uses a threshold value, e.g., stored in a configuration register, to specify when a request deadline value is considered to be high priority. Each deadline value for a request is compared against the threshold value programmed in the configuration register. When the deadline latency is less than the value in the configuration register, a bit is set in the tracker's scoreboard entry for the request indicating the request is a high priority request.

When enabled for two priority level operation, if a write request for an agent reaches the head of the linked list and the high priority bit is set for the request the write request is considered to be high priority. If any write requests at the head of any of the agent linked lists indicate the write request is a high priority request, all low priority write requests at the head of the other linked list for other agents are masked before being input to the write request arbiter. If multiple requests of the same priority level are present at the head of the agent linked lists, an arbitration is performed to select which agent to choose to transfer the write data.

Request Tracker Write Request Arbiter

The write request arbiter uses a weighted priority based fair arbiter to select which agent to transfer write data. The weights for the write request arbiter are programmed in configuration registers in the request tracker. The write arbiter assigns each agent a unique priority at reset. On each cycle, the arbiter only considers request candidates with data that is ready to transfer, and grants to the requester with the highest priority. When granted, a request candidate's weight is decremented by one. If the granted candidate already had a weight of zero, then the arbiter also updates request candidate priorities as follows: the granted candidate's priority is set to the lowest priority (e.g., zero): all candidates with priorities lower than the granted candidate increment their priority, and all candidates with priorities higher than the granted candidate leave their priority unchanged.

Request Tracker Read Data Return

Requesting agents either support in order data return or out-of-order data return. To support out-of-order data return, an order ID field is used. An order ID is sent from the agent with each request and is stored in the request tracker scoreboard. Requests from the same agent that have the same order ID are returned in request order. Data for requests from the same agent having different order IDs do not need to be returned in request order. In an embodiment, the request tracker uses linked lists for ensuring read data is properly ordered when it is returned to the requesting agent.

The entry of the internal data buffer where data is to be written is chosen prior to a request being granted by the admit arbiter. When a request is granted by the admit arbiter, request information including the index into the internal data buffer is forwarded to the request tracker. As data is returned from the memory controller, the memory scheduler forwards a read completion indication to the request tracker, which includes the index field into the internal data buffer where the data is being written and an indication of which chunks of the memory address have completed a read of memory. When the request tracker receives a read completion, it compares the index field with the index fields for all requests Stored in the request tracker scoreboard. If a scoreboard entries' index field matches a read completion for a request and all chunk bits for the request are set for the read completion, a bit is set in the request tracker scoreboard indicating the read request has completed.

If a read request has reached the head of the linked list and the read completion status bit in the request tracker is set and all coherency checks for the request have completed, the request is available to return read data to the agent. Similar to write requests, the request tracker uses the request deadline information for a scoreboard entry to indicate request priority. In one embodiment, the request tracker creates two request bit vectors for scoreboard entries that have data ready to return to the requesting agents. One bit vector is for low priority read requests and the other bit vector is for high priority read requests. The request bit vectors are input to the request tracker oldest of available queue. The oldest of available queue determines which request is the oldest for both request hit vectors. The request tracker has a configuration mode which when enabled will cause a return of data from the oldest high priority request selected by the oldest of available queue before returning data for any low priority requests. When support of the high priority data return is not enabled, the request tracker treats all scoreboard entries that are ready to return read data as having the same priority level. In this mode, only the low priority bit vector is used as an input to the oldest of available queue that in turn determines the oldest read request in the scoreboard. Read data for the scoreboard entry determined to be the oldest is then returned to the requesting agent.

Embodiments may be used in many different SoCs or other semiconductor devices that integrate various IPs onto a single die to connect these IPs to memory via a memory fabric. Still further a memory fabric in accordance with an embodiment of the present Specification may be used to provide a Q0S level for meeting isochronous requirements of at least some of these IPs.

FIG. 10 is a block diagram of an SoC according to one or more examples of the present Specification. As shown in FIG. 10, SoC 700 is a single die semiconductor device including multiple IP blocks along with a shared memory arbiter as described above. In the embodiment of FIG. 10 a plurality of cores 710-1-710-n are provided, each of which can independently execute instructions. In one embodiment, all of these cores are of a single design such as an in-order core design, e.g., of an Intel Architecture™ such as an Core™-based design. In other embodiments, the cores may be out-of-order processors such as an Intel Architecture™ (IA) 32 core such as an Intel Core™-based design. In other embodiments, a mix of heterogeneous cores may be provided. In addition, a plurality of graphics engines, namely independent graphics units 720-0-720-n, may be provided each to independently perform graphics operations. As seen, the multiple cores are coupled to a shared cache memory 715 such as a level 2 (L2) cache and similarly, the graphics engines are coupled to another shared cache memory 725.

A system agent 730 is coupled to these cores and graphics engines via corresponding in-die interconnects 728 and 729. As seen, system agent 730 includes a shared memory fabric 735 which may be configured as described herein. Various other logic, controllers and other units such as a power management unit may also be present within system agent 730. As seen, shared memory fabric 735 communicates with a memory controller 740 that in turn couples to an off-chip memory such as a system memory configured as DRAM. In addition, system agent 730 is coupled via a set of interconnects 744 to one or more internal agents 750 such as various peripheral devices. In an embodiment, interconnect 744 may include a priority channel interconnect, a sideband channel interconnect, and a memory channel interconnect. A similarly configured interconnect 74 provides for communication between system agent 730 and one or more off-chip agents (not shown for ease of illustration in the embodiment of FIG. 10). It should be noted that the block diagram of FIG. 10 is intended to be non-limiting, and that other elements and modifications may be present in various embodiments.

FIG. 11 is a block diagram of components present in a computer system according to one or more examples of the present Specification. As shown in FIG. 11, system 800 can include many different components. These components can be implemented as ICs, portions thereof, discrete electronic devices, or other modules adapted to a circuit board such as a motherboard or add-in card of the computer system, or as components otherwise incorporated within a chassis of the computer system. Note also that the block diagram of FIG. 11 is intended to show a high level view of many components of a computer system, however, it is to be understood that additional components may be present in certain implementations and furthermore, different arrangement of the components shown may occur in other implementations.

As seen in FIG. 11, a processor 810, which may be a low power multicore processor socket such as an ultra-low voltage processor, may act as a main processing unit and central hub for communication with the various components of the system. Such a processor can be implemented as a SoC as described herein. In one embodiment, processor 810 may be an Intel® Architecture Core™-based processor such as an i3, i5, i7, or another such processor available from Intel Corporation, Santa Clara, Calif., such as a processor that combines one or more Core™-based cores and one or more Intel® ATOM™-based cores to thus realize high power and low power cores in a single SoC. However, understand that other low power processors such as available from Advanced Micro Devices. Inc. (AMD) of Sunnyvale, Calif., and ARM-based design from ARM holdings, Ltd., or a MIPS-based design from MIPS Technologies, Inc., of Sunnyvale. Calf., or their licensees or adopters may instead be present in other embodiments such as an Apple A5 or A6 processor. In yet other embodiments, processor 810 may be a virtual processor realized as a combination of hardware and/or software in a virtual machine.

Processor 810 may communicate with a system memory 815, which in an embodiment can be implemented via multiple memory devices to provide for a given amount of system memory. To provide for persistent storage of information such as data, applications, one or more operating systems and so forth, a mass storage 820 may also couple to processor 810. Also shown in FIG. 11, a flash device 822 may be coupled to processor 810, e.g., via a serial peripheral interface (SPI). This flash device may provide for non-volatile storage of system software, including a basic input/output software (BIOS) as well as other firmware of the system.

Various input/output (to) devices may be present within system 800. Specifically shown in the embodiment of FIG. 11 is a display 824 which may be a high definition LCD or LED panel configured within a lid portion of the chassis. This display panel may also provide for a touch screen 825, e.g., adapted externally over the display panel such that via a user's interaction with this touch screen, user inputs can be provided to the system to enable desired operations. e.g., with regard to the display of information, accessing of information and so forth. In one embodiment, display 824 may be coupled to processor 810 via a display interconnect that can be implemented as a high performance graphics interconnect. Touch screen 825 may be coupled to processor 810 via another interconnect, which in an embodiment can be an I2C interconnect. As further shown in FIG. 11, in addition to touch screen 825, user input by way of touch can also occur via a touch pad 830 which may be configured within the chassis and may also be coupled to the same I2C interconnect as touch screen 825.

For perceptual computing and other purposes, various sensors may be present within the system and can be coupled to processor 810 in different manners. Certain inertial and environmental sensors may couple to processor 810 through a sensor hub 840, e.g., via an I2C interconnect. In the embodiment shown in FIG. 11, these sensors may include an accelerometer 841, an ambient light sensor (ALS) 842, a compass 843, and a gyroscope 844. Other environmental sensors may include one or more thermal sensors 846, which may couple to processor 810 via a system management bus (SMBus) bus in one embodiment.

Also seen in FIG. 11, various peripheral devices may couple to processor 810 via a low pin count (LPC) interconnect. In the embodiment shown, various components can be coupled through an embedded controller 835. Such components can include a keyboard 836 (e.g., coupled via a PS2 interface), a fan 837, and a thermal sensor 839. In some embodiments, touch pad 830 may also couple to EC 835 via a PS2 interface. In addition, a security processor such as a trusted platform module (TPM) 838 in accordance with the Trusted Computing Group (TCG) TPM Specification Version 1.2, dated Oct. 2, 2003, may also couple to processor 810 via this LPC interconnect.

System 800 can communicate with external devices in a variety of manners, including wirelessly. In the embodiment shown in FIG. 11, various wireless modules, each of which can correspond to a radio configured for a particular wireless communication protocol, are present. One manner for wireless communication in a short range such as a near field may be via a near field communication (NFC unit 845 which may communicate, in one embodiment with processor 810 via an SMBus. Note that via this NFC unit 845, devices in close proximity to each other can communicate. For example. a user can enable system 800 to communicate with another (e.g.,) portable device such as a smartphone of the user via adapting the two devices together in close relation and enabling transfer of information such as identification information payment information, data such as image data or so forth. Wireless power transfer may also be performed using a NFC system.

As further seen in FIG. 11, additional wireless units can include other short range wireless engines including a WLAN unit 850 and a Bluetooth unit 852. Using WLAN unit 850, Wi-Fi™ communications in accordance with a given Institute of Electrical and Electronics Engineers (IEEE) 802.11 standard can be realized, while via Bluetooth unit 852, short range communications via a Bluetooth protocol can occur. These units may communicate with processor 810 via, e.g., a USB link or a universal asynchronous receiver transmitter (UART) link. Or these units may couple to processor 810 via an interconnect via a Peripheral Component Interconnect Express™ (PCIe™) protocol in accordance with the PCI Express Specification Base Specification version 3.0 (published Jan. 17, 2007), or another such protocol such as a serial data input/output (SDIO) standard. Of course, the actual physical connection between these peripheral devices, which may be configured on one or more add-in cards, can be by way of the next generation form factor (NGFF) connectors adapted to a motherboard.

In addition, wireless wide area communications. e.g., according to a cellular or other wireless wide area protocol, can occur via a wireless wide area network (WWAN) unit 856 which in turn may couple to a subscriber identity module (SIM) 857. In addition, to enable receipt and use of location information, a GPS module 855 may also be present. Note that in the embodiment shown in FIG. 11, WWAN unit 856 and an integrated capture device such as a camera module 854 may communicate via a given USB protocol such as a USB 2.0 or 3.0 link, or a UART or I2C protocol. Again the actual physical connection of these units can be via adaptation of a NGFF add-in card to an NGFF connector configured on the motherboard.

To provide for audio inputs and outputs, an audio processor can be implemented via a digital signal processor (DSP) 860, which may couple to processor 810 via a high definition audio (HDA) link. Similarly. DSP 860 may communicate with an integrated coder/decoder CODEC) and amplifier 862 that in turn may couple to output speakers 863 which may be implemented within the chassis. Similarly, amplifier and CODEC 862 can be coupled to receive audio inputs from a microphone 865 which in an embodiment can be implemented via dual array microphones to provide for high quality audio inputs to enable voice-activated control of various operations within the system. Note also that audio outputs can be provided from amplifier/CODEC 862 to a headphone jack 864.

FIG. 12 is a block diagram of an SoC in situ in an example control system. It should be noted, however, that a control system, and this particular control system, are provided by way of non-limiting example only.

In the example of FIG. 12, SoC 1200 includes a multicore processor, including RT agent 115-0 and auxiliary agent 115-1. RT agent 115-0 acts as a real-time (isochronous) agent, while auxiliary agent 115-1 acts as a best effort agent.

RT agent 115-0 and auxiliary agent 115-1 share memory controller 170-0 and memory controller 170-1, which control memory bank 1220-0 and 1220-1 respectively. In certain examples, memory bank 1220-0 and memory bank 1220-1 are completely independent of one another, and may be interleaved such that even-numbered memory addresses go through memory controller 170-0 to bank 1220-0, while odd-numbered memory locations are routed through memory controller 170-1 to memory bank 1220-1. This is provided by way of example only, and other memory configurations and interleaving methods are available. It should also be noted that in this example, memory controllers 170 and memory banks 1220 are shown on a separate memory bus. This is also disclosed by way of non-limiting example. In other examples, other memory architectures may be used, such as a shared bus, or a network-on-a-chip.

RT agent 115-0 may be configured to interface with a control subsystem 1290 for controlling a device under control 1292. In one embodiment, device under control 1292 may be a mission-critical or safety-critical device such as a manufacturing robot, life support system, environmental control system, traffic control system, or drive-by-wire system by way of non-limiting example. Control subsystem 1290 provides to RT agent 115-0 all of the software, firmware, and hardware necessary to control device under control 1292. The requirements of controlled system 1290 may be such that a guaranteed QoS is necessary to maintain real-time operation.

However, it may also be desirable to provide auxiliary functions, such as a user interface so that a user can provide necessary inputs. Auxiliary agent 115-1 may also provide functions such as monitoring and user feedback. Thus, it is desirable to design SoC 1200 so that RT agent 115-0 is guaranteed its necessary QoS for its real-time functions, but doesn't completely monopolize system resources so that auxiliary agent 115-1 is unable to perform its function, or vice versa. To this end, a shared uncore fabric 1230 with multiple virtual channels to separate out real-time and auxiliary traffic, and an associated priority scheme, may be provided to grant higher priority to real-time traffic, while leaving sufficient bandwidth for auxiliary agent 115-1 to function properly.

In this example, RT agent 115-0 communicatively couples to controlled system 1290 via suitable means, such as a network interface, dedicated bus, or other connection. In this drawing, RT agent 115-0 also communicatively couples to RT peripheral device 1210-0 via shared uncore fabric 1230. In certain embodiments, shared uncore fabric 1230 may be provided as single or multiple modular IP blocks for simplicity of design.

For simplicity of the drawing, and to illustrate that many different styles of interconnect are possible, no physical or logical connection is illustrated here between RT peripheral device 1210-0 and control subsystem 1290. But this is not intended to exclude such a connection. In some examples, RT peripheral device 1210-0 may be a control interface that forms a part of control subsystem 1290, or a physical and logical interface to device under control 1292, in which case a logical and/or physical connection may be provided. In other embodiments, RT peripheral device 1210-0 may provide other real-time functionality that may or may not be directly logically related to device under control 1292.

Similarly, auxiliary agent 115-1 communicatively couples to user interface 1270 by way of example, or to any other suitable auxiliary system or subsystem. User interface 1270 may, similar to control subsystem 1290, provide any suitable set of software, firmware, and hardware for provisioning a user interface.

Auxiliary agent 1150-1 also communicatively couples to auxiliary peripheral device 1210-1 via shared uncore fabric 1230. As with real-time peripheral device 1210-0, auxiliary peripheral device 1210-1 may or may not communicatively couple to user interface 1270. For simplicity of the drawing, and to illustrate that many different connection options are possible, no physical or logical connection is shown in this figure between auxiliary peripheral device 1210-1 and user interface 1270, but in some embodiments, such a connection may be provided.

In a non-limiting example, selected elements of shared uncore fabric 1230 include a shared I/O fabric 1232, shared memory fabric 100, and a system agent 730. Shared I/O fabric 1232 provides interconnects, scheduling, and other communication services to peripheral devices 1210. In one example, shared I/O fabric 1232 is substantially similar to shared memory fabric 100, including implementing similar priority schemes to those described in this Specification. Shared memory fabric 100 was described in more detail in connection with FIGS. 1-9. System agent 730 includes a controller to provide intelligence to shared uncore fabric 100, including methods described herein. In one example, additional hardware, firmware, or software may include executable instructions or microcode that provide instructions for system agent 730 to perform the functions disclosed herein. Peripherals 1210, memory banks 1220, and any similar devices that connect to requesting agents via uncore fabric 1230 may be collectively referred to as "data terminals," indicating that they ultimately send data to or receive data from agents 115.

In one example, shared uncore fabric 1230 includes only one set of physical buses, interconnects, registers, and other resources that real-time agent 115-0 and auxiliary agent 115-1 (along with any other agents) may use to communicatively couple to peripheral devices 1210, and to memory controllers 170. Thus, to ensure a guaranteed QoS for real-time agent 115-0, shared interconnect resources 1230 may need to provide a priority scheme between agents 115, peripherals 1210, and memory controllers 170.

Certain embodiments of a shared uncore fabric may employ only one virtual channel that is shared between all agents. However, the present Specification also describes a method of providing a plurality of virtual channels so that shared uncore fabric 1230 can discriminate, segregate, and prioritize between traffic for real-time agent 115-0 and traffic for auxiliary agent 115-1. This segregation may be desirable so that in cases where it is necessary, traffic from real-time agent 115-0 may receive priority, including preemptive priority over traffic from auxiliary agent 115-1.

In one example, two virtual channels are defined: namely virtual channel VC_AUX 1240, and virtual channel VC_RT 1242. VC_AUX 1240 may be provided for best-effort transactions, while VC_RT 1242 is dedicated to real-time or isochronous transactions. Traffic patterns may include agent-to-peripheral (via shared I/O fabric 1232), agent-to-memory (via shared memory fabric 100), peripheral-to-agent (via shared I/O fabric 1232), peripheral to memory (via shared I/O fabric 1232 and shared memory fabric 100), and memory-to-peripheral (via shared I/O fabric 1232 and shared memory fabric 100).

Division into virtual channels may be accomplished in one example by decoding the source agent for a packet originating from an agent 115. It should be noted that in certain known embodiments, the destination of each packet is decoded for routing purposes, and may be based on attributes of the packet such as memory address and/or opcode. In this example, destination decoding may still be provided, and may be in addition to decoding of the source agent. Once the source agent is decoded, the packet may be assigned to a "traffic class," which may have a one-to-one correspondence to a virtual channel. For example, traffic class 0 may correspond to VC_AUX, while traffic class 1 may correspond to VC_RT. Advantageously, the traffic class may be encoded as a field in the header or metadata for the packet so that endpoints such as peripherals 1210 need not be aware of the virtual channel architecture to preserve end-to-end virtual channel functionality. This may preserve legacy interoperability. In one example, system agent 730 may prepend header data to each packet, identifying the virtual channel or traffic class on which the packet is to be carried. Certain virtual channels may be given certain priority weights according to the QoS scheme described herein. Priority schemes may include providing a high "grant count" number for high-priority traffic and/or assigning traffic on VC_RT an expired deadline to expedite that traffic.

In the case of a packet, such as a response packet, originating from a peripheral 1210, the peripheral 1210 may not be aware of the virtual channel architecture. However, a well-configured peripheral 1210 should echo back the traffic class field that was attached to the packet it is responding to. Thus, a legacy peripheral 1210 may be able to successfully direct the packet to its appropriate virtual channel despite being agnostic of the existence of multiple virtual channels within shared uncore fabric 1230.

In the case of a packet originating from a peripheral 1210 and directed to memory 1220 (rather than a response to an agent 115), a traffic class may be assigned based on the nature of the peripheral 1210 itself. For example, if RT peripheral 1210 is known to be generally used for real-time transactions, then packets from RT peripheral 1210 to memory 1220 may be directed to VC_RT. Similarly, packets originating from auxiliary peripheral device 1210-1 and directed to memory 1220 may be directed to VC_AUX.

In one example, virtual channels may also be further subdivided, for example according to the destination of each packet. Thus, for example, traffic from real-time agent 115-0 to any memory controller 170 may be given very high or even preemptive priority to guarantee a QoS. However, traffic from real-time agent 115-0 to real-time peripheral device 1210-0 may be less time critical. Thus, this traffic may be assigned a somewhat lower (though possibly still expedited) priority. In one example, VC_RT and VC_AUX may be prioritized differently based on which shared resource is being considered. For example, a VC_RT and VC_AUX path from peripherals to memory may use deadlines for different prioritization, while a VC_RT and VC_AUX path between cores and peripherals may use grant counts. These configurations are, of course, provided by way of non-limiting example only. A person having skill in the art will select an appropriate priority scheme according to the design constraints of a particular embodiment.

FIG. 13 illustrates an example of additional selected elements of an SoC, such as SoC 1200 of FIG. 12. In this example, a plurality of agents 115 are provided, specifically eight total agents in four dual-core CPUs. Each CPU includes a cache 1310 (shared between the two cores), and provides an output bus 1370. It may be necessary to maintain cache coherency between all cores 115. Thus, shared uncore fabric 100 may provide cache coherency trackers as described herein.

Output buses 1370 may have, in one example, some 600 to 700 lines for carrying the various signals. Thus, it is impractical in certain embodiments to individually route every line to shared uncore fabric 100. Rather, four selectors 1320 are provided. Selectors 1320 multiplex traffic from cores 115. In a general sense, for p cores, only n input buses need to be provided into shared uncore fabric 100. In this particular case, p=8, and n=2.

However, in certain embodiments, it is not sufficient for selector 1320 to be a simple multiplexer. For example, a traditional multiplexer may block certain inputs depending on a select signal. This may not be acceptable for SoC 1200, as every packet from an agent 115 needs to be eventually delivered to shared uncore fabric 100. Thus, in an example, selector 1320 is a non-blocking multiplexer. This may be accomplished, for example, by providing a queue in the form of a first-in-first-out (FIFO) buffer. With the FIFO buffer, all packets are delivered to shared uncore fabric 100, in the order in which they were received.

FIGS. 14 and 14A are a block diagram of an embodiment of selector 1320 according to one or more examples of the present Specification. In this example, a number of signals are either "core to uncore" (C2U), or "uncore to core" (U2C). By way of illustration, each bus includes a data width, though it should be understood that these data width are provided as nonlimiting examples. As can be seen, many of the necessary buses are very large, such as U2C data, which is 128-bits wide. Thus, it is advantageous to multiplex these signals. However, other signals are much narrower, and in some embodiments need not be multiplexed. For example "C2U REPLY" is only 15-bits wide.

Thus, in certain embodiments, narrow buses may be provided without multiplexing, regardless of their direction. This helps to speed up certain critical data transactions.

Note that a number of queues are provided throughout selector 1320. The following are provided by way of example.

U2C Request Queue 1410 may include an IDI bubble generator FIFO (BGF) credit counters, which handle conversion from logic block clock ratio and voltage to system interface clock ratio and voltage and vice versa. From the IDI perspective, such FIFOS are link layer structures that transport protocol layer messages, and each BGF writer locally tracks the available BGF credits needed to gain use of the structure entries.

C2U Request Arbiter 1420 includes a slice hash and weighted age arbitration. It may also include a B-admit C2U request FIFO credit counter.

U2C data FIFO 1430 may include IDI BGF credit counters.

C2U data arbiter 1440 may include a weighted-age four-count arbitration write data FIFO credit counter.

U2C response FIFO 1450 includes IDI BGF credit counters.

In FIG. 14A, satellite C2U request arbiter 1460 includes a weighted round robin B-admit C2U request FIFO credit counter.

Satellite U2C data queue 1462 includes BGF credit counters.

Satellite U2C response queue 1470 includes BGF credit counters.

Satellite C2U data arbiter 1480 includes weighted round robin priority C2U data FIFO credit counter.

Satellite C2U data queue 1490 includes BGF credit counters.

Embodiments of the present Specification provide advantages over certain embodiments that provide only a single VC for downstream traffic, some of which do not provide end-to-end QoS for real-time applications.

There is disclosed herein by way of example, an interconnect apparatus, comprising: a cache coherency tracker; a data interface to communicatively couple the cache coherency tracker to p cache-coherent agents, the data interface comprising n input buses, wherein n<p; and at least one multiplexer to selectively provide inputs from at least two of the cache-coherent agents to one of the input buses.

There is further disclosed an example, wherein the multiplexer is a non-blocking multiplexer.

There is further disclosed an example, wherein the multiplexer is a queuing multiplexer.

There is further disclosed an example, wherein the queuing multiplexer comprises a first-in first-out queue.

There is further disclosed an example, wherein the n input buses are to receive a first signal, and further comprising p non-multiplexed input buses to receive a second signal.

There is further disclosed an example, wherein the p input buses to receive the second signal are of a substantially smaller data width than the n input buses to receive the first signal.

There is further disclosed an example, further comprising p non-multiplexed output buses to provide a return signal.

There is further disclosed an example, wherein the p non-multiplexed output buses are of a substantially smaller data width than the n input buses.

There is further disclosed by way of example, a computing system, comprising: p cache-coherent agents; at least one shared resource; and a shared fabric to communicatively couple the p cache-coherent agents to the at least one shared resource, comprising: a cache coherency tracker; a data interface to communicatively couple the cache coherency tracker to the p cache-coherent agents, the data interface comprising n input buses, wherein n<p; and at least one multiplexer to selectively provide inputs from at least two of the cache-coherent agents to one of the input buses.

There is further disclosed an example, wherein the multiplexer is a non-blocking multiplexer.

There is further disclosed an example, wherein the multiplexer is a queuing multiplexer.

There is further disclosed an example, wherein the queuing multiplexer comprises a first-in first-out queue.

There is further disclosed an example, wherein the n input buses are to receive a first signal, and further comprising p non-multiplexed input buses to receive a second signal.

There is further disclosed an example, wherein the p input buses to receive the second signal are of a substantially smaller data width than the n input buses to receive the first signal.

There is further disclosed an example, further comprising p non-multiplexed output buses to provide a return signal.

There is further disclosed an example, wherein the p non-multiplexed output buses are of a substantially smaller data width than the n input buses.

There is further disclosed by way of example, a method of maintaining cache coherency in a computing system, comprising: receiving inputs from p cache-coherent agents; multiplexing the p inputs into n input buses, where p<n; and providing the p inputs to a shared fabric.

There is further disclosed an example, wherein multiplexing the p inputs comprises non-blocking multiplexing.

There is further disclosed an example, wherein multiplexing the p inputs comprises queuing the inputs.

There is further disclosed an example, wherein the queuing comprises first-in first-out queuing.

There is further disclosed an example, wherein the p inputs comprise a first signal, and further comprising receiving p non-multiplexed inputs comprising a second signal.

There is further disclosed an example, further comprising providing p non-multiplexed outputs.

While the present invention has been described with respect to a limited number of embodiments, those skilled in the art will appreciate numerous modifications and variations therefrom. It is intended that the appended claims cover all such modifications and variations as fall within the true spirit and scope of this present invention.

A design may go through various stages, from creation to simulation to fabrication. Data representing a design may represent the design in a number of manners. First, as is useful in simulations, the hardware may be represented using a hardware description language or another functional description language. Additionally, a circuit level model with logic and/or transistor gates may be produced at some stages of the design process. Furthermore, most designs, at some stage, reach a level of data representing the physical placement of various devices in the hardware model. In the case where conventional semiconductor fabrication techniques are used, the data representing the hardware model may be the data specifying the presence or absence of various features on different mask layers for masks used to produce the integrated circuit. In any representation of the design, the data may be stored in any form of a machine readable medium. A memory or a magnetic or optical storage such as a disc may be the machine readable medium to store information transmitted via optical or electrical wave modulated or otherwise generated to transmit such information. When an electrical carrier wave indicating or carrying the code or design is transmitted, to the extent that copying, buffering, or re-transmission of the electrical signal is performed, a new copy is made. Thus, a communication provider or a network provider may store on a tangible, machine-readable medium, at least temporarily, an article, such as information encoded into a carrier wave, embodying techniques of embodiments of the present invention.

A module as used herein refers to any combination of hardware, software, and/or firmware. As an example, a module includes hardware, such as a micro-controller, associated with a non-transitory medium to store code adapted to be executed by the micro-controller. Therefore, reference to a module, in one embodiment, refers to the hardware, which is specifically configured to recognize and/or execute the code to be held on a non-transitory medium. Furthermore, in another embodiment, use of a module refers to the non-transitory medium including the code, which is specifically adapted to be executed by the microcontroller to perform predetermined operations. And as can be inferred, in yet another embodiment, the term module (in this example) may refer to the combination of the microcontroller and the non-transitory medium. Often module boundaries that are illustrated as separate commonly vary and potentially overlap. For example, a first and a second module may share hardware, software, firmware, or a combination thereof, while potentially retaining some independent hardware, software, or firmware. In one embodiment, use of the term logic includes hardware, such as transistors, registers, or other hardware, such as programmable logic devices.

Use of the phrase 'to' or 'configured to,' in one embodiment, refers to arranging, putting together, manufacturing, offering to sell, importing and/or designing an apparatus, hardware, logic, or element to perform a designated or determined task. In this example, an apparatus or element thereof that is not operating is still 'configured to' perform a designated task if it is designed, coupled, and/or interconnected to perform said designated task. As a purely illustrative example, a logic gate may provide a 0 or a 1 during operation. But a logic gate 'configured to' provide an enable signal to a clock does not include every potential logic gate that may provide a 1 or 0. Instead, the logic gate is one coupled in some manner that during operation the 1 or 0 output is to enable the clock. Note once again that use of the term 'configured to' does not require operation, but instead focus on the latent state of an apparatus, hardware, and/or element, where in the latent state the apparatus, hardware, and/or element is designed to perform a particular task when the apparatus, hardware, and/or element is operating.

Furthermore, use of the phrases 'capable of/to,' and or 'operable to,' in one embodiment, refers to some apparatus, logic, hardware, and/or element designed in such a way to enable use of the apparatus, logic, hardware, and/or element in a specified manner. Note as above that use of to, capable to, or operable to, in one embodiment, refers to the latent state of an apparatus, logic, hardware, and/or element, where the apparatus, logic, hardware, and/or element is not operating but is designed in such a manner to enable use of an apparatus in a specified manner.

A value, as used herein, includes any known representation of a number, a state, a logical state, or a binary logical state. Often, the use of logic levels, logic values, or logical values is also referred to as 1's and 0's, which simply represents binary logic states. For example, a 1 refers to a high logic level and 0 refers to a low logic level. In one embodiment, a storage cell, such as a transistor or flash cell, may be capable of holding a single logical value or multiple logical values. However, other representations of values in computer systems have been used. For example the decimal number ten may also be represented as a binary value of 1010 and a hexadecimal letter A. Therefore, a value includes any representation of information capable of being held in a computer system.

Moreover, states may be represented by values or portions of values. As an example, a first value, such as a logical one, may represent a default or initial state, while a second value, such as a logical zero, may represent a non-default state. In addition, the terms reset and set, in one embodiment, refer to a default and an updated value or state, respectively. For example, a default value potentially includes a high logical value, i.e. reset, while an updated value potentially includes a low logical value, i.e. set. Note that any combination of values may be utilized to represent any number of states.

The embodiments of methods, hardware, software, firmware or code set forth above may be implemented via instructions or code stored on a machine-accessible, machine readable, computer accessible, or computer readable medium which are executable by a processing element. A non-transitory machine-accessible/readable medium includes any mechanism that provides (i.e., stores and/or transmits) information in a form readable by a machine, such as a computer or electronic system. For example, a non-transitory machine-accessible medium includes random-access memory (RAM), such as static RAM (SRAM) or dynamic RAM (DRAM); ROM; magnetic or optical storage medium; flash memory devices; electrical storage devices; optical storage devices; acoustical storage devices; other form of storage devices for holding information received from transitory (propagated) signals (e.g., carrier waves, infrared signals, digital signals); etc, which are to be distinguished from the non-transitory mediums that may receive information there from.

Instructions used to program logic to perform embodiments of the invention may be stored within a memory in the system, such as DRAM, cache, flash memory, or other storage. Furthermore, the instructions can be distributed via a network or by way of other computer readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium includes any type of tangible machine-readable medium suitable for storing or transmitting electronic instructions or information in a form readable by a machine (e.g., a computer)

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In the foregoing specification, a detailed description has been given with reference to specific exemplary embodiments. It will, however, be evident that various modifications and changes may be made thereto without departing from the broader spirit and scope of the invention as set forth in the appended claims. The specification and drawings are, accordingly, to be regarded in an illustrative sense rather than a restrictive sense. Furthermore, the foregoing use of embodiment and other exemplarily language does not necessarily refer to the same embodiment or the same example, but may refer to different and distinct embodiments, as well as potentially the same embodiment.

What is claimed is:

1. An interconnect apparatus, comprising:
   a cache coherency tracker;
   a data interface providing a shared fabric to communicatively couple the cache coherency tracker to a plurality of n multi-core processors providing p cache-coherent agents, wherein n<p, the data interface comprising n input buses communicatively coupled to the n multi-core processors; and
   at least one non-blocking multiplexer to selectively provide inputs from the n cache-coherent agents to the n input buses;
   wherein the cache coherency tracker is configured to maintain full cache coherency between the n multicore processors.

2. The interconnect apparatus of claim 1, wherein the at least one non-blocking multiplexer is a queuing multiplexer.

3. The interconnect apparatus of claim 2, wherein the queuing multiplexer comprises a first-in first-out queue.

4. The interconnect apparatus of claim 1, wherein the n input buses are to receive a first signal, and further comprising p non-multiplexed input buses to receive a second signal.

5. The interconnect apparatus of claim 4, wherein the p non-multiplexed input buses to receive the second signal are of a smaller data width than the n input buses to receive the first signal.

6. The interconnect apparatus of claim 1, further comprising p non-multiplexed output buses to provide a return signal.

7. The interconnect apparatus of claim 6, wherein the p non-multiplexed output buses are of a smaller data width than the n input buses.

8. A computing system, comprising:
   p cache-coherent agents;
   at least one shared resource; and
   a shared fabric to communicatively couple the p cache-coherent agents to the at least one shared resource, comprising:
      a cache coherency tracker;
      a data interface providing a shared fabric to communicatively couple the cache coherency tracker to a plurality of n multi-core processors providing the p cache-coherent agents, wherein n<p, the data interface comprising n input buses communicatively coupled to the n multi-core processors; and
   at least one non-blocking multiplexer to selectively provide inputs from the p cache-coherent agents to the n input buses;
      wherein the cache coherency tracker is configured to maintain full cache coherency between the n multi-core processors.

9. The computing system of claim 8, wherein the at least one non-blocking multiplexer is a queuing multiplexer.

10. The computing system of claim 9, wherein the queuing multiplexer comprises a first-in first-out queue.

11. The computing system of claim 8, wherein the n input buses are to receive a first signal, and further comprising p non-multiplexed input buses to receive a second signal.

12. The computing system of claim 11, wherein the p non-multiplexed input buses to receive the second signal are of a smaller data width than the n input buses to receive the first signal.

13. The computing system of claim 8, further comprising p non-multiplexed output buses to provide a return signal.

14. The computing system of claim 13, wherein the p non-multiplexed output buses are of a smaller data width than the n input buses.

* * * * *